US008499277B2

(12) United States Patent
Tone et al.

(10) Patent No.: US 8,499,277 B2
(45) Date of Patent: Jul. 30, 2013

(54) PROGRAMMING SUPPORT APPARATUS, PROGRAMMING SUPPORT METHOD, PROGRAM FOR CAUSING COMPUTER TO IMPLEMENT THE METHOD, AND RECORDING MEDIUM CONTAINING THE PROGRAM

(75) Inventors: Yuzuru Tone, Chiyoda-ku (JP); Satoru Nakai, Chiyoda-ku (JP); Masayuki Ueno, Chiyoda-ku (JP); Tetsuji Honnami, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 1126 days.

(21) Appl. No.: 12/088,177

(22) PCT Filed: Mar. 29, 2006

(86) PCT No.: PCT/JP2006/306516
§ 371 (c)(1),
(2), (4) Date: Mar. 26, 2008

(87) PCT Pub. No.: WO2007/110953
PCT Pub. Date: Oct. 4, 2007

(65) Prior Publication Data
US 2009/0276059 A1 Nov. 5, 2009

(51) Int. Cl.
*G06F 9/44* (2006.01)
(52) U.S. Cl.
USPC .......................................................... 717/100
(58) Field of Classification Search
None
See application file for complete search history.

(56) References Cited

U.S. PATENT DOCUMENTS

| 5,452,201 | A | 9/1995 | Pieronek et al. |
|---|---|---|---|
| 5,530,643 | A | 6/1996 | Hodorowski et al. |
| 5,659,707 | A * | 8/1997 | Wang et al. .................. 711/145 |
| 6,081,833 | A | 6/2000 | Okamoto et al. |
| 7,024,463 | B1 | 4/2006 | Hitomi et al. |
| 7,139,901 | B2 * | 11/2006 | Musoll et al. ................. 712/228 |
| 7,162,476 | B1 * | 1/2007 | Belair et al. ........................... 1/1 |
| 7,275,236 | B1 | 9/2007 | Kabe |
| 7,665,077 | B2 * | 2/2010 | Mariani et al. ................ 717/148 |
| 2002/0188811 | A1 * | 12/2002 | Ma et al. ........................ 711/151 |
| 2006/0101446 | A1 * | 5/2006 | Mariani et al. ................ 717/166 |

FOREIGN PATENT DOCUMENTS

| EP | 1231526 A1 | 8/2002 |
|---|---|---|
| EP | 1351108 A1 | 10/2003 |
| JP | 10-23047 A | 1/1989 |
| JP | 06-161762 A | 6/1994 |

(Continued)

OTHER PUBLICATIONS

Q Corresponding MELSECNET/H Network System: Mitsubishi General-Purpose Sequencer MELSEC-Q, Oct. 2005, pp. 2-7.

(Continued)

*Primary Examiner* — Li B Zhen
*Assistant Examiner* — Evral Bodden
(74) *Attorney, Agent, or Firm* — Sughrue Mion, PLLC

(57) ABSTRACT

A shared-label extracting unit extracts a shared label to be associated with a device corresponding to a memory shared by a plurality of control devices. A shared-label write/read information generating unit identifies a control device writing data and a control device reading data with respect to the shared label by referring to a control program, and generates shared-label write/read information. A device batch assigning/associating unit sorts shared labels using the shared-label write/read information, and associates the shared label with an address of the device for each sort based on a result of determining a configuration of the control system.

5 Claims, 31 Drawing Sheets

FOREIGN PATENT DOCUMENTS

| | | |
|---|---|---|
| JP | 6505621 A | 6/1994 |
| JP | 6311202 A | 11/1994 |
| JP | 8286716 A | 11/1996 |
| JP | 991011 A | 4/1997 |
| JP | 2001-195257 A | 7/2001 |
| JP | 2002-055816 A | 2/2002 |
| JP | 200291514 A | 3/2002 |
| JP | 2003015705 A | 1/2003 |
| JP | 2005-242682 A | 9/2005 |
| WO | 9306652 A1 | 4/1993 |
| WO | 01/27701 A1 | 4/2001 |
| WO | 0127701 A1 | 4/2001 |
| WO | 0242853 A1 | 5/2002 |

OTHER PUBLICATIONS

Taiwanese Office Action dated Aug. 24, 2009.

* cited by examiner

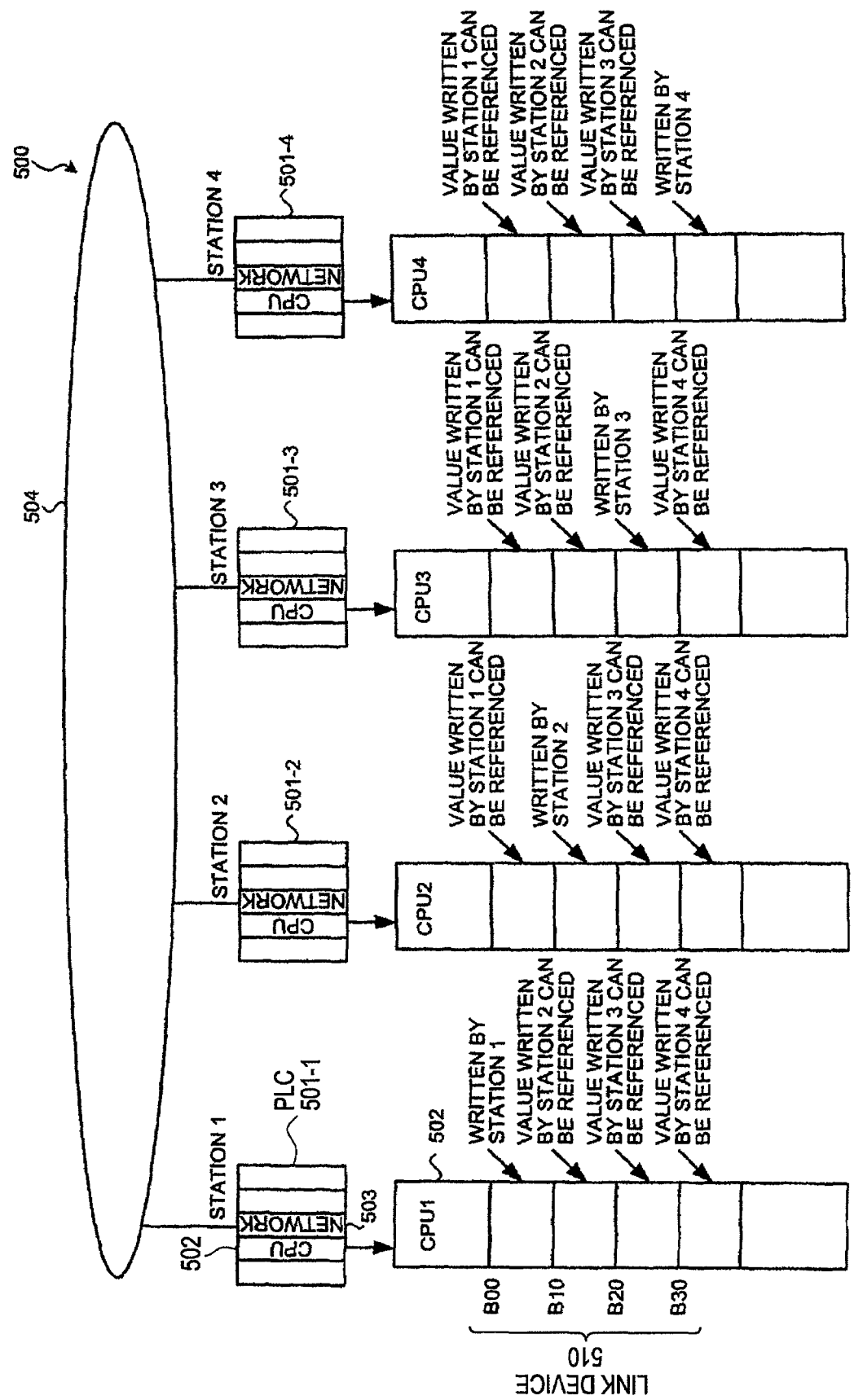

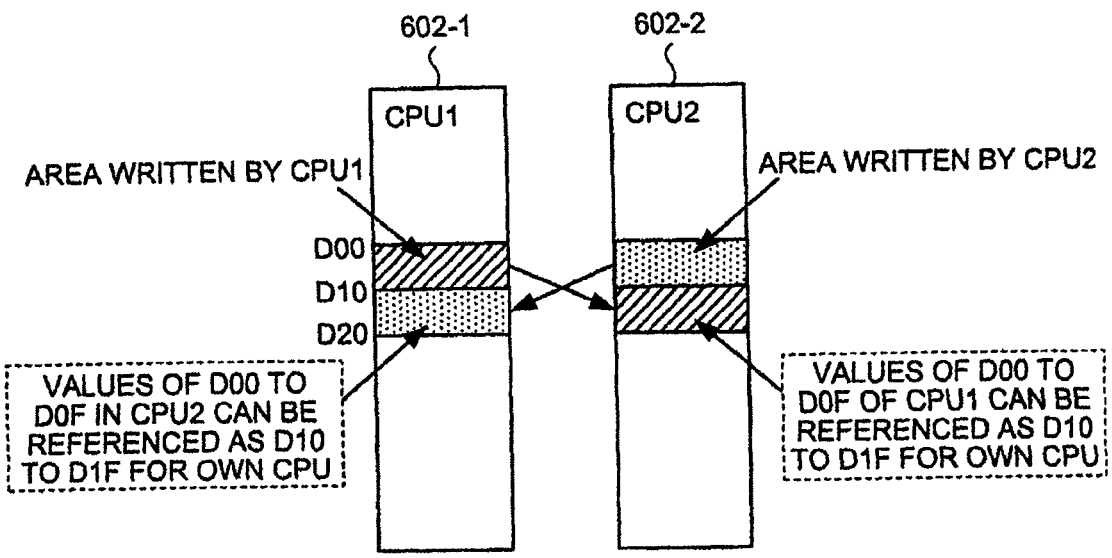

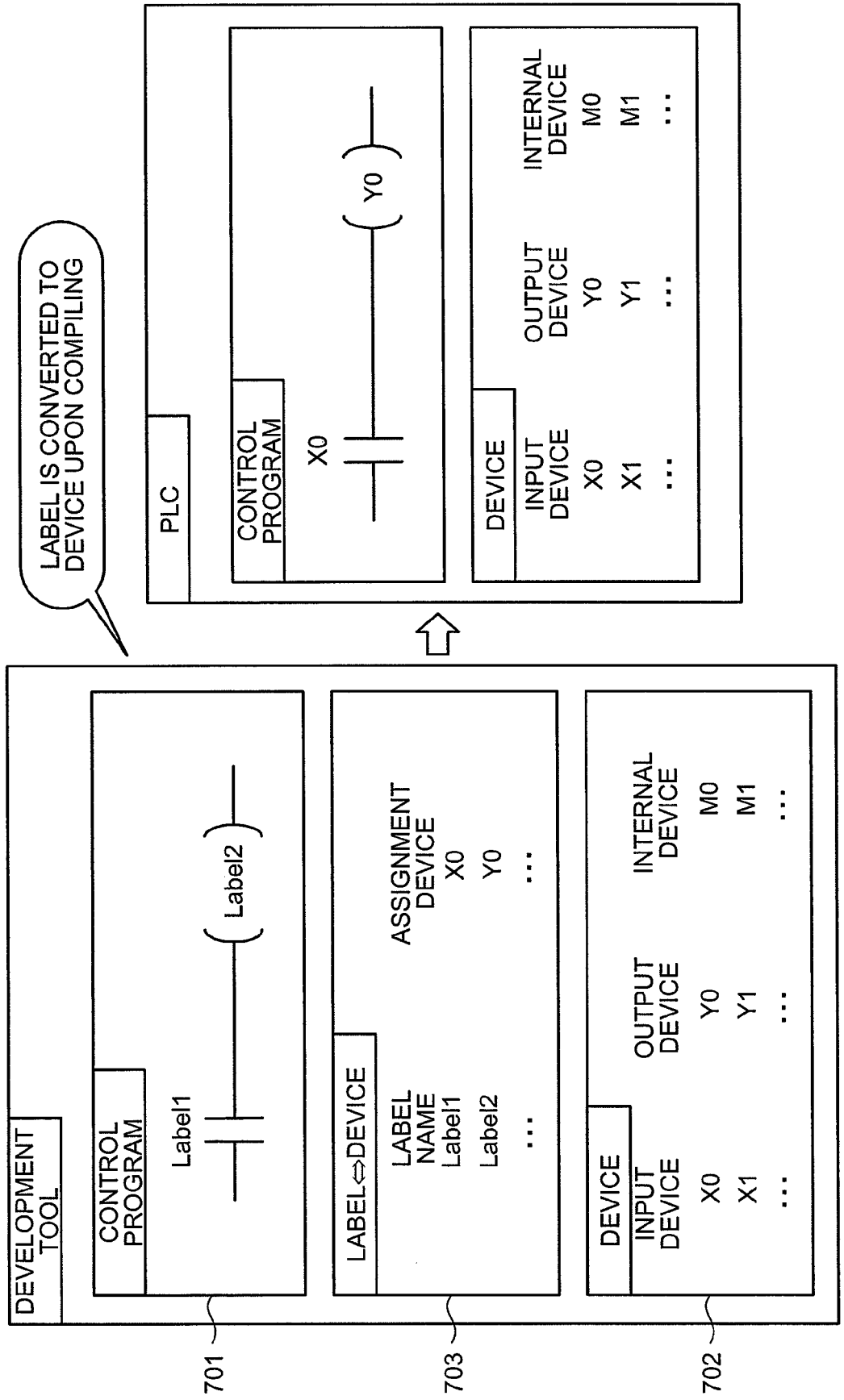

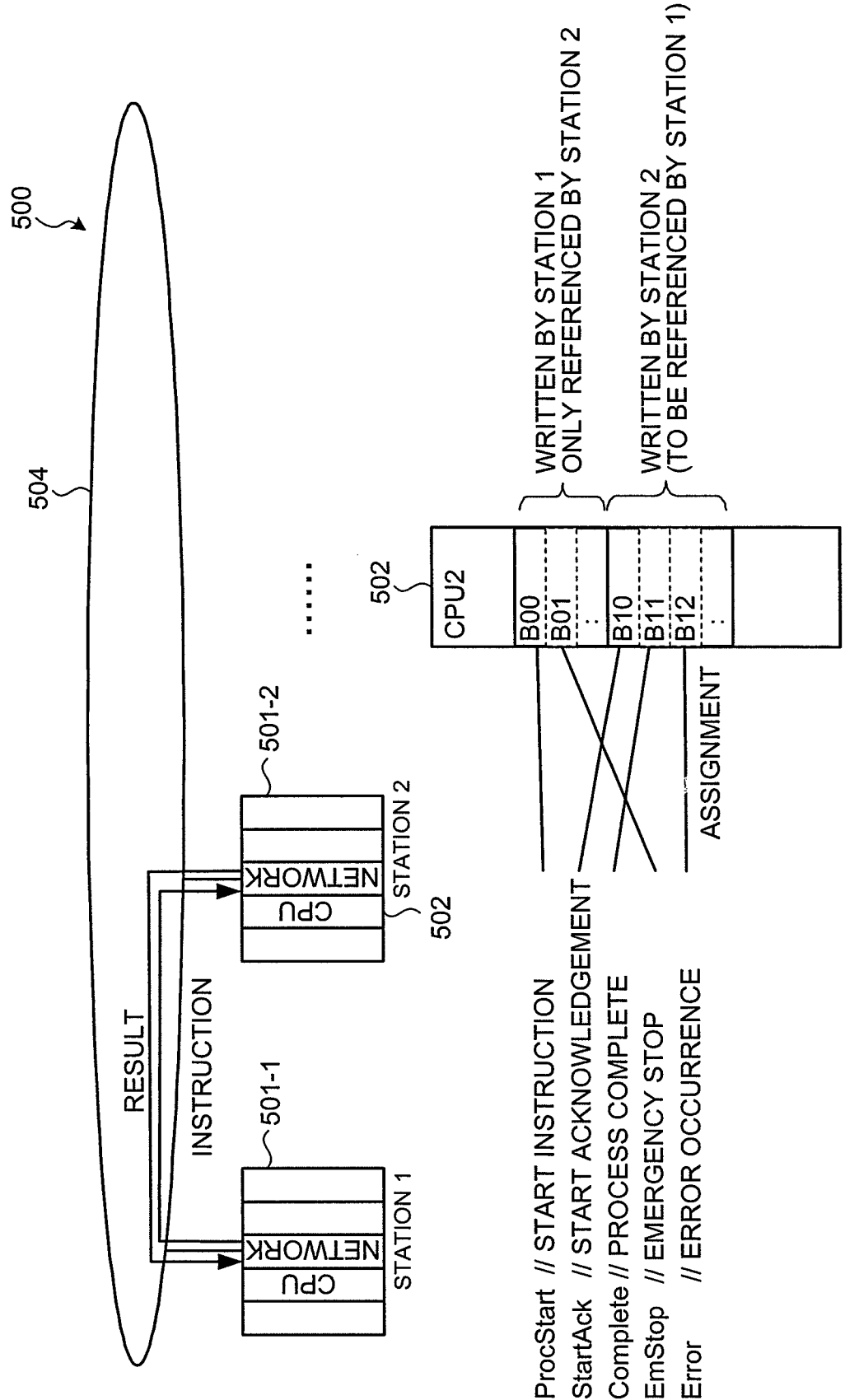

FIG.19

|   |   |   |   |   |   |
|---|---|---|---|---|---|
| LabelA | = | PLC1 | WRITE | PLC2 | READ |
| LabelD | = | PLC1 | READ | PLC2 | WRITE |
| LabelF | = | PLC1 | READ | PLC2 | WRITE |
| LabelG | = | PLC1 | WRITE | PLC2 | READ |

| LINK-DEVICE ASSOCIATION LABEL TABLE | SHARED-REFRESH-DEVICE ASSOCIATION LABEL TABLE |
|---|---|
| LabelA = PLC1 WRITE PLC2 READ<br>LabelD = PLC1 READ PLC2 WRITE<br>LabelF = PLC1 READ PLC2 WRITE<br>LabelG = PLC1 WRITE PLC2 READ | (NONE) |
| 114 | 115 |

FIG.22

LINK-DEVICE ASSOCIATION LABEL TABLE

```
LabelA = PLC1 WRITE PLC2 READ
LabelD = PLC1 READ  PLC2 WRITE
LabelF = PLC1 READ  PLC2 WRITE
LabelG = PLC1 WRITE PLC2 READ
```
~114

↓ S141

PLC-WRITING LABEL CLASSIFICATION TABLE

```
LabelA = PLC1 WRITE PLC2 READ   ⎫
LabelG = PLC1 WRITE PLC2 READ   ⎬ LABEL WRITTEN BY PLC1
--------------------------------
LabelD = PLC1 READ  PLC2 WRITE  ⎫
LabelF = PLC1 READ  PLC2 WRITE  ⎬ LABEL WRITTEN BY PLC2
```
116

S142
ASSIGNMENT IN LINK DEVICE

| WRITE STATION | AREA |
|---|---|
| PLC1 | B00 TO B0F |
| PLC2 | B10 TO B1F |

S143
ASSOCIATION OF SHARED LABEL WITH LINK DEVICE

```
LabelA = B00
LabelG = B01
-----------
LabelD = B10
LabelF = B11
```

FIG.29

| MECHANICAL ELEMENT | WRITE DATA 1 | WRITE DATA 2 | ... | READ DATA 1 | READ DATA 2 | ... |
|---|---|---|---|---|---|---|
| GEAR | | | | GEAR RATIO: NUMBER OF GEARS ON INPUT SIDE | GEAR RATIO: NUMBER OF GEARS ON OUTPUT SIDE | |
| CLUTCH | | | | ON/OFF INSTRUCTION | | |
| ROTARY TABLE | WITHIN-ONE-REVOLUTION CURRENT VALUE | | | | | |
| BALL SCREW | | | | TORQUE LIMIT VALUE | | |
| ... | | | | | | |

FIG.32

| LABEL NAME | PLC1 | PLC2 |
|---|---|---|
| LabelA | WRITE | READ |
| LabelD | READ | WRITE |
| LabelF | READ | WRITE |
| LabelG | WRITE | READ |

PROGRAMMING SUPPORT APPARATUS, PROGRAMMING SUPPORT METHOD, PROGRAM FOR CAUSING COMPUTER TO IMPLEMENT THE METHOD, AND RECORDING MEDIUM CONTAINING THE PROGRAM

TECHNICAL FIELD

The present invention relates to a programming support apparatus that supports creation of a control program for each of a plurality of controllers provided in a control system, and also relates to a programming support method, a program that causes a computer to implement the method, and a recording medium that stores therein the program.

BACKGROUND ART

A programmable controller (hereinafter, "PLC"), a motion controller (hereinafter, "MC"), and an HMI (Human Machine Interface: display and SCADA (Supervisory Control And Data Acquisition)) have conventionally been used to control machines such as processing machines and assembling machines. Recently, a control system using a plurality of PLCs is often constructed for a case where a manufacturing line is formed with a plurality of devices, in addition to a case where a single device is controlled. The control system constructed by using the PLCs has two systems, (1) a link control system in which a plurality of PLCs, each of which includes a CPU (Central Processing Unit) unit and a network unit, is connected to each other via a network, and (2) a multi-CPU control system in which a plurality of CPU units is mounted on a base unit and the respective CPU units are connected to each other via a bus to form a PLC.

(1) Link Control System

The link control system requires data exchange between the PLCs as explained above, and to realize this, the PLCs are connected to each other by an FA (Factory Automation) network to exchange data. In this link control system, data is exchanged between the PLCs via link devices. FIGS. 1-1 is a schematic of one example of the configuration of the link control system and the link devices. FIGS. 1-2 is a schematic of one example of the content of the link device in the PLC of the control system shown in FIGS. 1-1. A control system 500 is configured so that PLCs 501-1 to 501-4, each of which has a CPU unit 502 and a network unit 503, are mutually connected to each other via an FA network 504. Each of the PLCs is called "station" and thus the PLCs 501-1 to 501-4 are respectively called "station 1 to station 4". The CPU unit 502 includes a link device 510, and data is exchanged between the PLCs 501-1 to 501-4 via each link device. Device values of other stations are periodically copied in the link device 510 of its own device, and the link device 510 has a function corresponding to that handled as a shared memory among the PLCs 501-1 to 501-4 connected to the FA network 504.

As shown in FIG. 1-2, one type of assignment is provided in the link device 510 through the network and the same setting of the assignment is used in each CPU 502 of the stations. However, when the assignment is to be provided in the link device 510, areas in the link device 510 to be written by one of the stations are continuously collected in one location. This is because when device values of other stations are periodically copied into the link device 510 of the own station, a plurality of data is efficiently transferred between the stations by collectively transmitting the plurality of data (device values collectively stored in the one location) in one transmission (see, for example, Patent document 1).

For example, in the link device 510 of each of the stations, device values of the station 1 are written in areas of addresses "B00 to B0F" (hereinafter, "block 1"), device values of the station 2 are written in areas of addresses "B10 to B1F" (hereinafter, "block 2"), device values of the station 3 are written in areas of addresses "B20 to B2F" (hereinafter, "block 3"), and device values of the station 4 are written in areas of addresses "B30 to B3F" (hereinafter, "block 4"). However, the own station can only write data in the areas of the station corresponding to a write station, but can only reference the areas of the other stations. For example, in the link device 510 of the station 1, the block 1 is where the station 1 itself can write device values, while the block 2 is where the station 2 writes device values and thus the station 1 can only reference the device values in the station 2. Furthermore, the blocks 3 and 4 are where the stations 3 and 4 write device values respectively, and thus, the station 1 can only reference the device values therein. The station 1 collectively stores the device values of the own station in the block 1, and thus periodically and collectively transmits these device values to the other stations.

(2) Multi-CPU Control System

The multi-CPU control system is explained below. When a plurality of PLCs is used to control a single device, one CPU is generally provided in each of the PLCs. However, one PLC is often formed with multiple CPUs instead, and a device may be collectively controlled by the one PLC. Similarly, when the manufacturing line is formed with a plurality of devices, one CPU is generally provided in each of the PLCs and a plurality of these PLCs is used to control the line. However, one PLC is formed with multiple CPUs instead, and a plurality of devices may also be collectively controlled by the one PLC (see, for example, Nonpatent literature 1). The control system having the PLC formed with such a multi-CPU configuration as above is called "multi-CPU control system" in this specification.

FIG. 2 is a schematic of the configuration of the multi-CPU control system. A multi-CPU control system 600 includes CPU units 602-1 to 602-4 mounted on a base unit 601. Provided in the base unit 601 is a bus 603 that connects between the CPU units 602-1 to 602-4. In the multi-CPU control system 600, data is mutually exchanged between the CPU units 602-1 to 602-4 via each shared refresh device.

FIG. 3-1 is a schematic of each shared refresh device of the multi-CPU control system, and FIG. 3-2 is a schematic of one example of setting for the shared refresh device in each PLC of the control system of FIG. 3-1. This figure shows that the multi-CPU control system is formed with the two CPU units 602-1 and 602-2. Each of the CPU units 602-1 and 602-2 includes the shared refresh device. Device values of the other CPUs are periodically copied into the shared refresh device of the own CPU. The shared refresh device has a function corresponding to that handled as a shared memory between the CPU units 602-1 and 602-2 connected to each other via the bus 603. It is noted that the function of periodically copying the device values of other CPU units into the device of the own CPU unit is called "multi-CPU auto-refresh function".

As shown in setting 610 of the shared refresh device of FIG. 3-2, when a refresh source CPU is the CPU unit 602-1, a head address in which a device value of the CPU unit 602-1 is written is set to "D00" as the multi-CPU auto-refresh function, and a head address in which a device value of the CPU unit 602-2 is written is set to "D10" as the same function. When the refresh source CPU is the CPU unit 602-2, a head address in which the device value of the CPU unit 602-1 is written is set to "D10" as the multi-CPU auto-refresh function, and a head address in which the device value of the CPU unit 602-2 is written is set to "D00" as the same function. The number of points of the device value at this time is 16.

As shown in FIG. 3-1, by setting the multi-CPU auto-refresh function in the above manner, addresses "D00 to D0F" of the CPU unit 602-1 are an area written by the CPU unit 602-1 itself, and addresses "D10 to D1F" of the CPU unit 602-1 are an area where device values in addresses "D00 to D0F" of the CPU unit 602-2 are written. Here, the CPU unit 602-1 can only reference the device values written by the CPU unit 602-2. Likewise, the addresses "D00 to D0F" of the CPU unit 602-2 are an area written by the CPU unit 602-2 itself, and the addresses "D10 to D1F" of the CPU unit 602-2 are an area where the device values in the addresses "D00 to D0F" of the CPU unit 602-1 are written. Here, the CPU unit 602-2 can only reference the device values written by the CPU unit 602-1.

As shown in FIG. 3-1 and FIG. 3-2, when the assignment is provided in the shared refresh device, the multi-CPU auto-refresh function is configured to continuously collect the device values written by one CPU in one location. This is because when the device values of other CPU units are periodically copied into the shared refresh device of the own CPU unit, a plurality pieces of data is efficiently transferred between CPU units by collectively transmitting the pieces of data (device values collectively stored in one location) in one communication.

The explanation so far indicates each outline of the link control system and the multi-CPU control system. Generally, a control program for PLC or MC used to control machines such as processing machines and assembling machines and a screen program for HMI have conventionally been described by using addresses of devices. FIG. 4 is a schematic of one example of a conventional control program. This figure shows a control program 701 described in a ladder program and a device table 702 in which device data used for the control program are written. As shown in the control program 701, the ladder program is described by a contact symbol 711 and a coil symbol 712. For example, when the control program for the link control system is to be described, a program for a portion related to data exchange between PLCs is described by using "B0" that indicates a link device. And when the control program for the multi-CPU control system is to be described, a program for a portion related to data exchange between CPUs is described by using "D0" that indicates a shared reference device.

Conventionally, it is general that the system of describing the program by using addresses of devices as shown in FIG. 4 has been used for the control program and the screen program. Recently, however, a system in which the program is described by using label names and each label name is separately associated with an address of each device is being generalized. FIG. 5 is a schematic of one example of a control program using labels. The control program 701, the device table 702, and a label-to-device association table 703 that associates a device with a label are represented in a development tool shown in the left side of FIG. 5. More specifically, the control program 701 is described by using labels, and devices and labels which can be used are previously associated with each other in the label-to-device association table 703. And the labels are respectively converted to corresponding devices upon compiling. After the conversion, the control program 701 is described by using the devices as shown in the right side of FIG. 5.

A label name has a data type such as BOOL and WORD. Therefore, when a label name is to be associated with a device, a BOOL-type label name is simply associated with a BOOL-type device, and thus there is no restriction in the association between a label and an address of a device. Moreover, any name can be given to the label name so that the content of the data can be identified by its name, and thus readability of the control program is improved as compared with the case where the control program is described by using devices. In terms of these points, creation of the control program by using label names can be more efficient as compared with the conventional case where the control program is created by using device addresses.

In the link control system 500 which mutually exchanges data between the PLCs 501 via the link devices, when each program for the PLCs 501 is described by using label names, it is desirable to use a same label name for data to be exchanged between the PLCs 501. The same goes for the multi-CPU control system 600 which exchanges data between the CPU units 602 via the shared refresh devices.

The label names are individually managed by each PLC 501 in the link control system 500. Therefore, if the same label name is to be used for the data exchanged between the PLCs 501, persons in charge for creation of each control program for the PLCs 501 have to previously "agree" to use the same label. The same goes for the multi-CPU control system 600 which exchanges data between the CPU units 602 via the shared refresh devices.

To unfailingly use the same label name in a plurality of PLCs 501, only the agreement between the persons in charge may cause any miss to occur due to failure of communication between the persons or the like. To solve this problem, as a technology for using the same label name between the PLCs 501, for example, a technology of sharing the label name between tools for creating programs for the PLCs 501 is proposed (see, for example, Patent document 2).

Patent document 1: Japanese Patent Application Laid-Open No. H6-311202
Patent document 2: International Publication No. 02/042853, Pamphlet
Patent document 3: Japanese Patent Application Laid-Open No. 2003-15705
Nonpatent literature 1: Q Corresponding MELSECNET/H Network System: Mitsubishi General-Purpose Sequencer MELSEC-Q, [online], Mitsubishi Electric Corp., December 2005.

DISCLOSURE OF INVENTION

Problem to be Solved by the Invention

However, even if the same labels are used for data exchanged between PLCs and data exchanged between CPUs, these labels need to be associated with the link devices of the link control system and with the shared refresh devices of the multi-CPU control system, and a problem that thereby arises is that the association becomes complicated.

The problem in the link control system is specifically explained below. One type of assignment is provided in the link device through the network and the same assignment setting is used in the PLCs of the stations. At this time, areas in the link device written by one station need to be continuously collected in one location. Therefore, when labels are to be associated with a link device, it is necessary to associate each label with the link device by considering which of the stations writes data for the label. For example, in FIG. 1-1, the label used as data to be written by the station 1 can only be associated with the link device written by the station 1. In addition to this, when the assignment is provided in the link device, it is necessary to count up all the points of the labels used as data to be written by the station 1, continuously collect these points in one location, and to assign them to the link device. In other words, despite that the programming is made efficient by using the labels, total efficiency cannot be much improved as compared with the conventional case where the programming is performed using the devices, because there newly arise a need for association of the label with the link device by considering assignment in the link device and a need for the assignment in the link device by considering all the points of the labels.

FIG. 6 is a schematic of one example of assignment in labels and assignment of the labels to the link device in the link control system. In the example of FIG. 6, the labels used as data to be written by the station 1 are "ProcStart" indicating a start instruction and "EmStop" indicating an emergency stop. When the assignment is to be provided in the link device, at least areas for two points need to be ensured as the link device written by the station 1. The labels used as data to be written by the station 2 are "StartAck" indicating start acknowledgement, "complete" indicating process complete, and "Error" indicating error occurrence. When the assignment is to be provided in the link device, at least areas for three points need to be ensured as the link device written by the station 2. It is necessary to provide the assignment in the link device by considering these conditions.

The labels "ProcStart" and "EmStop" used as the data to be written by the station 1 need to be collectively associated with the addresses "B00 to B0F" which are assigned as the link device written by the station 1. The labels "StartAck", "complete", and "Error" used as the data to be written by the station 2 need to be collectively associated with the addresses "B10 to B1F" which are assigned as the link device written by the station 2. The association of the labels with the link device needs to be performed at the time of associating the respective labels of the station 1 and the station 2 with devices by considering these conditions.

Next, the problem is specifically explained in the multi-CPU control system. When assignment is to be provided in a shared refresh device, areas in a shared refresh device to be written by one CPU need to be continuously collected in one location. Therefore, when labels are to be associated with a shared refresh device, the labels need to be associated with the shared refresh device by considering which of the CPUs writes each of the labels. Referring to FIG. 3-1, for example, the label used as data to be written by the CPU unit 602-1 can only be associated with the shared refresh device written by the CPU unit 602-1. In addition to this, when the assignment is provided in the shared refresh device, it is necessary to count up all the points of the labels used as data to be written by the CPU unit 602-1, continuously collect these points in one location, and to assign them to the shared refresh device. In other words, despite that the programming is made efficient by using the labels, total efficiency cannot be much improved as compared with the conventional case where the programming is performed using the devices, because there newly arise a need for association of the label with the shared refresh device by considering assignment in the shared refresh device and a need for the assignment in the shared refresh device by considering all the points of the labels.

FIG. 7 is a schematic of one example of assignment in labels and assignment of the labels to the shared refresh device in the multi-CPU control system. In the example of FIG. 7, the labels used as data to be written by the CPU unit 602-1 are "ProcReady" indicating a ready instruction and "ProcStart" indicating a start instruction. When the assignment is to be provided in the shared refresh device, at least areas for two points need to be ensured as the shared refresh device written by the CPU unit 602-1. The labels used as data to be written by the CPU unit 602-2 are "ReadyOK" indicating that the operation is ready, "StartAck" indicating start acknowledgement, and "complete" indicating process complete. When the assignment is to be provided in the shared refresh device, at least areas for three points need to be ensured as the shared refresh device written by the CPU unit 602-2. The assignment in the shared refresh device needs to be provided by considering these conditions.

In the association of the label with the device in the CPU unit 602-1, the labels "ProcReady" and "ProcStart" used as the data to be written by the CPU unit 602-1 need to be associated with the addresses "D00 to D0F" which are assigned as the shared refresh device written by the CPU unit 602-1. The labels "ReadyOK", "StartAck", and "complete" used as the data to be written by the CPU unit 602-2 need to be associated with the addresses "D10 to D1F" which are assigned as the shared refresh device written by the CPU unit 602-2. Furthermore, in the association of the label with the device in the CPU unit 602-2, the labels "ProcReady" and "ProcStart" used as the data to be written by the CPU unit 602-1 need to be associated with the addresses "D10 to D1F" which are assigned as the shared refresh device written by the CPU unit 602-1, and the labels "ReadyOK", "StartAck", and "complete" used as the data to be written by the CPU unit 602-2 need to be associated with the addresses "D00 to D0F" which are assigned as the shared refresh device written by the CPU unit 602-2. The association of the labels with the shared refresh device needs to be performed at the time of associating the respective labels of the CPU unit 602-1 and the CPU unit 602-2 with devices by considering these conditions.

As a technology to solve such a complication as explained above, a technology is proposed in which a device includes a unit that automatically associates local memories in respective PLCs with labels added to data exchanged between the PLCs and that equalizes the local memories via a network (see, for example, Patent document 3).

In the Patent document 3, however, the equalizing unit is used to implement equalization by transmitting a value read request for each data to be equalized, receiving response data, and writing the response data without using the link control system and the multi-CPU control system. Therefore, communications for equalization become a bottle neck, and the period of equalization is thereby delayed. More specifically, there is not much difference between a processing time required to transfer one point of data between PLCs and a processing time required to collectively transfer ten points of data between PLCs. Therefore, to individually transfer the ten points of data ten times between PLCs means that the processing time requires ten times as compared with that of the case where the ten points of data are collectively transferred between PLCs.

The functions such as the link device and the shared refresh device are prepared as systems of data exchange between PLCs in the link control system and of data exchange between CPU units in the multi-CPU control system. This is because the problem in the Patent document 3 such that "communications become the bottle neck and the period of equalization is thereby delayed" is avoided. Thus, it is configured to continuously collect devices written by one station or by one CPU in one location and assign them to the link device or to the shared refresh device.

The present invention has been achieved to solve the conventional problems. And it is an object of the present invention to obtain the programming support apparatus, the programming support method, the program that causes a computer to implement the method, and the recording medium that stores therein the program, capable of creating the program using the same labels between PLCs based on the function of the link device in which data is exchanged at a high speed between PLCs in the link control system, or using the same labels between multiple CPUs based on the function of the shared refresh device in which data is exchanged at a high speed between multiple CPUs in the multi-CPU control system, and capable of simplifying the assignment in the link device or the assignment in the shared refresh device and of simplifying the association of labels with the link device or with the shared refresh device.

Means for Solving Problem

To achieve the above object, a programming support apparatus according to the present invention supports creation of a control program using a label with which each of a plurality of controllers provided in a control system controls an object to be controlled. The programming support apparatus includes a shared-label extracting unit that extracts a shared label to be associated with a device corresponding to a memory shared by the controllers, from control programs for the respective controllers; a shared-label write/read information generating unit that determines which of the controllers writes data for the shared label and which of the controllers reads data for the shared label by referring to the control programs, and generates shared-label write/read information; and a device batch assigning/associating unit that sorts shared labels to be written by the controllers, for each of the controllers using the shared-label write/read information, and associates the shared label with an address of the device for each sort.

Effect of the Invention

According to the present invention, the program using the same label name for data exchange between the controllers can be created, and the association of the label with the device and the assignment in the device are automatically performed. Thus, the efficiency of device development can be improved by creating the program using the same label between the controllers. Moreover, the development of the control system in which data is exchanged at a high speed between the controllers due to the function of the link device can be realized.

BRIEF DESCRIPTION OF DRAWINGS

FIG. 1-1 is a schematic of one example of the configuration of the link control system and link devices of the system.

FIG. 1-2 is a schematic of one example of the content of the link device in the PLC of the control system shown in FIG. 1-1.

FIG. 2 is a schematic of the configuration of the multi-CPU control system.

FIG. 3-1 is a schematic of each shared refresh device of the multi-CPU control system.

FIG. 3-2 is a schematic of one example of setting for the shared refresh device in each PLC of the control system of FIG. 3-1.

FIG. 5 is a schematic of one example of a control program using labels.

FIG. 6 is a schematic of one example of assignment in labels and assignment of the labels to the link device in the link control system.

FIG. 11-1 is a schematic of how a label is associated with a real device using a label editing tool.

FIG. 11-2 is a schematic of how a label is associated with a real device using another tool.

FIG. 19 is a schematic of one example of shared-label write/read information.

FIG. 20 is a schematic of one examples of a link-device association label table and a shared-refresh-device association label table.

FIG. 22 is a schematic of a specific procedure for the network batch assignment/association process D.

FIG. 28-1 is a schematic of one example of parameters of each mechanical element in FIG. 27.

FIG. 28-2 is a schematic of one example of parameters of each mechanical element in FIG. 27.

FIG. 28-3 is a schematic of one example of parameters of each mechanical element in FIG. 27.

FIG. 28-4 is a schematic of one example of parameters of each mechanical element in FIG. 27.

FIG. 28-5 is a schematic of one example of parameters of each mechanical element in FIG. 27.

FIG. 29 is a schematic of one example of mechanical-element attribute information for the mechanical elements in FIG. 28-1 to FIG. 28-5.

FIG. 32 is a schematic of one example of shared-label write/read information according to a fifth embodiment.

EXPLANATIONS OF LETTERS OR NUMERALS

| | |
|---|---|
| 10 | Programming support apparatus |
| 10A | Development tool |
| 11 | Display unit |
| 12 | Input unit |
| 13 | System-configuration setting unit |
| 14 | Label setting unit |
| 15 | Program setting unit |
| 16 | Label-to-device association processor |
| 17 | Compiling processor |
| 18 | Display processor |
| 19 | Controller |
| 21 | Tree view |
| 22 | System configuration |
| 22A | System-configuration editing tool |
| 23 | Label |
| 23A, 23B | Label editing tool |
| 24 | Program |
| 24A | Program editing tool |
| 25 | Hardware configuration |
| 26 | Label association |
| 26A | Label-to-device association tool |

BEST MODE(S) FOR CARRYING OUT THE INVENTION

Exemplary embodiments of the programming support apparatus, the programming support method, the program that causes a computer to implement the method, and the recording medium that stores therein the program according to the present invention are explained in detail below with reference to the accompanying drawings. It is noted that the present invention is not limited by these embodiments.

At first, the configuration of the programming support apparatus (hereinafter, also called "development tool") used in the present invention and the outline of a procedure for creating the program in the programming support apparatus are explained, and then the embodiments of the present invention based on the programming support apparatus are explained.

Figure 8:
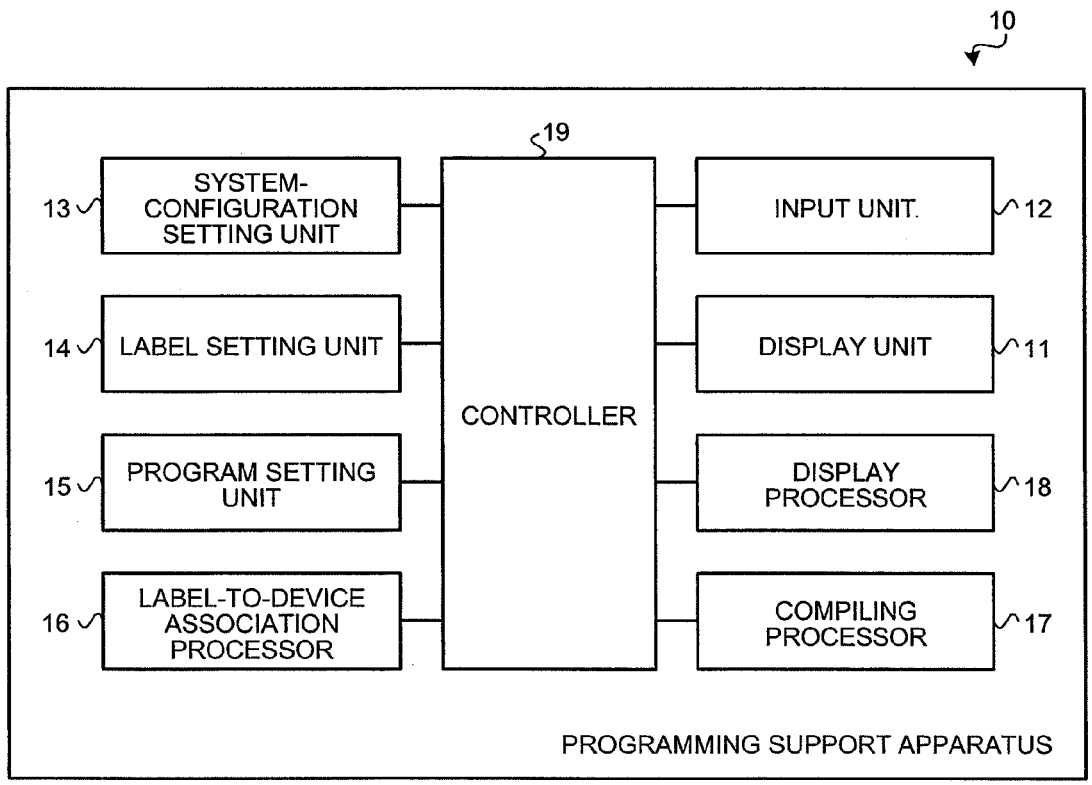
FIG. 8 is a schematic block diagram of the functional configuration of the programming support apparatus.
Figure 9:
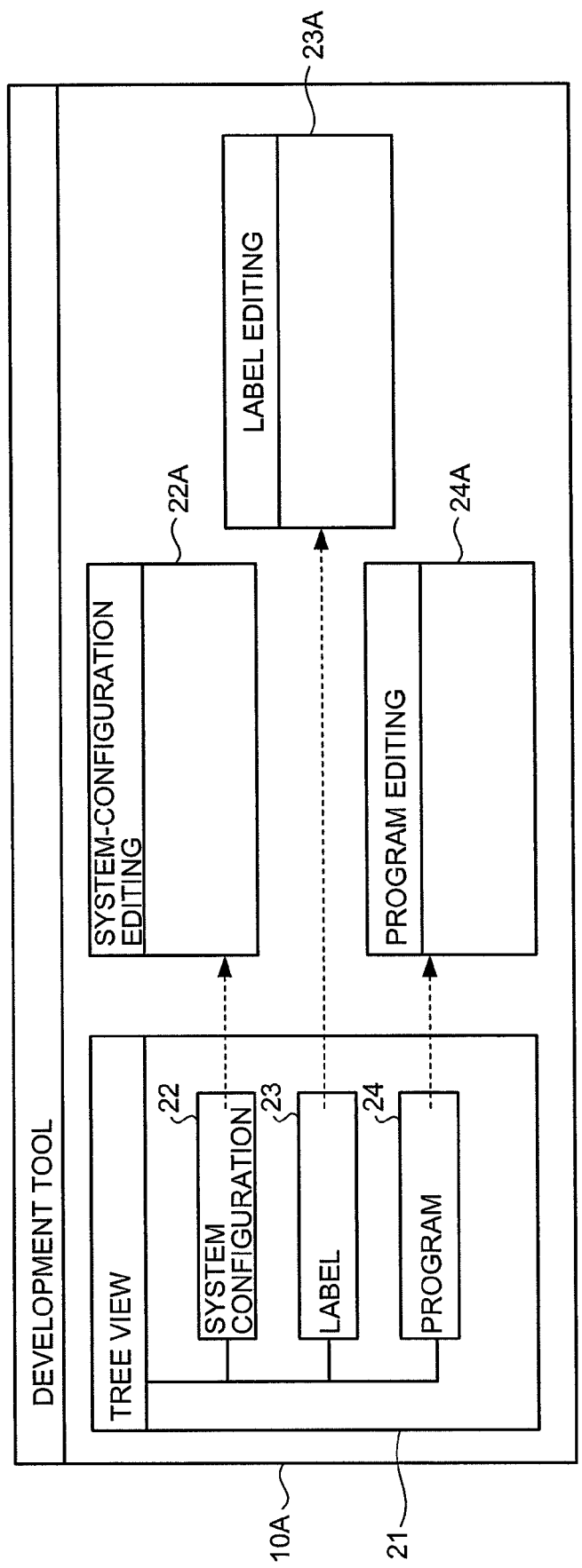
FIG. 9 is a schematic of the configuration on a display screen of a development tool realizing the programming support apparatus.

FIG. 8 is a schematic block diagram of the functional configuration of the programming support apparatus, and FIG. 9 is a schematic of the configuration on a display screen of a development tool realizing the programming support apparatus.

A programming support apparatus 10 includes a display unit 11 that displays information to a user, an input unit 12 through which predetermined information required for programming is input by the user, a system-configuration setting unit 13 that sets a system configuration based on the information input through the input unit 12, a label setting unit 14 that sets a label based on the information input through the input unit 12, a program setting unit 15 that sets a program based on the information input through the input unit 12, a label-to-device association processor 16 that associates the label set by the label setting unit 14 to a real device, a compiling processor 17 that compiles a created program, a display processor 18 that performs a display process so as to display a setting screen of a system configuration, a setting screen of a label, a setting screen of a program, and a label-to-real device association screen on the display unit 11, and also includes a controller 19 that controls these processors.

A development tool 10A includes a tree view 21 that is displayed on the programming support apparatus 10 and that displays editable components thereon, and an editing tool that edits a component selected on the tree view 21. As shown in FIG. 9, the tree view 21 shows the components used for programming the PLC and the MC. The tree view 21 includes a system configuration 22, a label 23, and a program 24. The tree view 21 is displayed on the display unit 11 by the display processor 18. When the system configuration 22, the label 23, or the program 24 is selected through the input unit 12 by double-clicking thereon or the like, corresponding one of the system-configuration setting unit 13, the label setting unit 14, and the program setting unit 15 is started.

The system-configuration setting unit 13 sets the configuration of each hardware system of the PLC and the MC such as an I/O (Input/Output) unit and a network based on the content input by the user. For example, when the system configuration 22 in the tree view 21 of FIG. 9 is selected, the system-configuration setting unit 13 starts window, dialog, editor, and tool (hereinafter, "system-configuration editing tool") 22A used to edit the system configuration, and sets the system configuration using the contents input therein.

The label setting unit 14 sets a label, instead of a device address, to be described upon description of a control program. For example, when the label 23 in the tree view 22 of FIG. 9 is selected, the label setting unit 14 starts window, dialog, editor, and tool (hereinafter, "label editing tool") 23A used to edit the label, and sets the label using the contents input therein.

The program setting unit 15 sets a control program (e.g., ladder program) causing the PLC and MC to process. For example, when the program 24 in the tree view 21 of FIG. 9 is selected, the program setting unit 15 starts window, dialog, editor, and tool (hereinafter, "program editing tool") 24A used to edit the program, and sets the program using the contents input therein.

The label-to-device association processor 16 associates each label used in a program (namely, set by the label setting unit 14) to each device in a real PLC and MC to operate the program set by the program setting unit 15 on the real PLC and MC.

Figure 10:
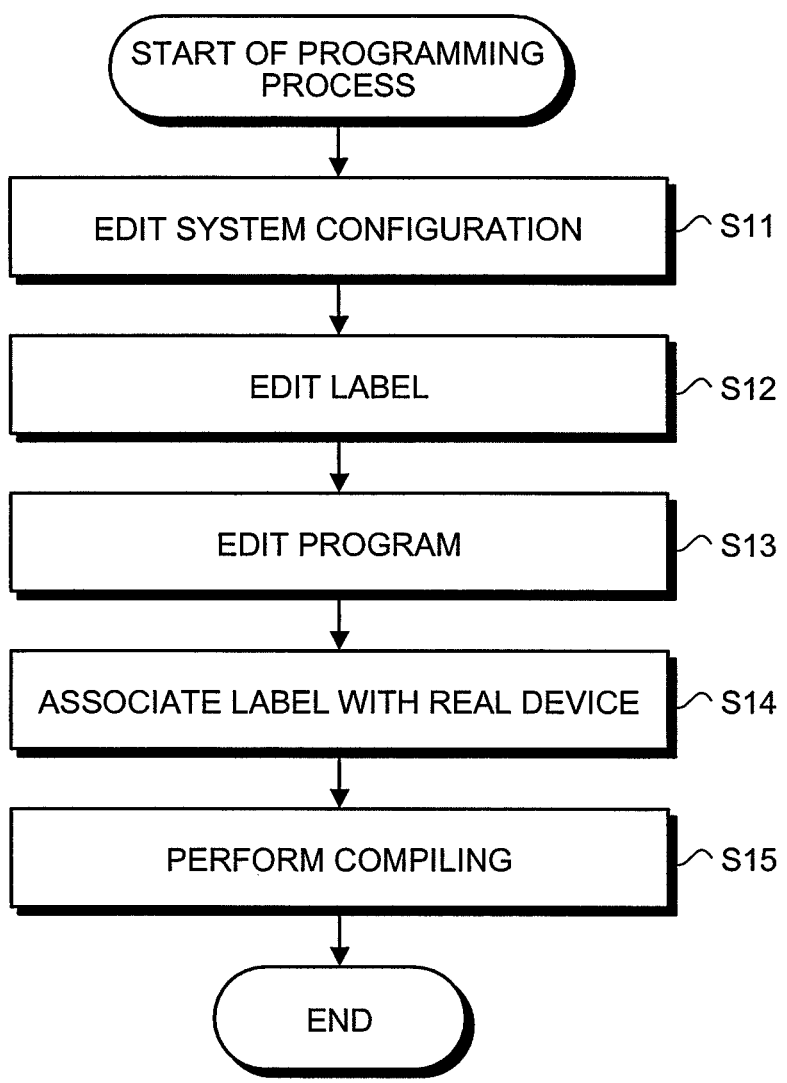
FIG. 10 is a flowchart of one example of a programming procedure.

FIG. 10 is a flowchart of one example of a programming procedure. In programming of the PLC, the system configuration is first edited (step S11). When the system configuration 22 is selected from the tree view 21 in the development tool 10A of FIG. 9, the system-configuration editing tool 22A is started. The user inputs each configuration of the hardware systems of the PLC and the MC such as the I/O unit and the network through the input unit 12 on the system-configuration editing tool 22A, and the system configuration is set based on the input contents.

Next, the label is edited (step S12). When the label 23 is selected from the tree view 21 in the development tool 10A of FIG. 9, the label editing tool 23A is started. The user inputs a label used for the program through the input unit 12 in the label editing tool 23A, and the label is set based on the input contents.

Next, the program is edited (step S13). When the program is selected from the tree view 21 in the development tool 10A of FIG. 9, the program editing tool 24A is started. The user specifies which of the PLCs or the CPUs in the system configuration is caused to execute a program to be described, through the input unit 12 in the program editing tool 24A, and then describes the program. The program is set based on the input contents.

Here, when the program is described at step S13, the label set at step S12 can be used. If a new label needs to be set during editing of the program at step S13, the label may be edited each time the setting is needed. In other words, editing of the label at step S12 may be performed in the middle of editing the program at step S13.

Figures 1, 2:
Figure 2:
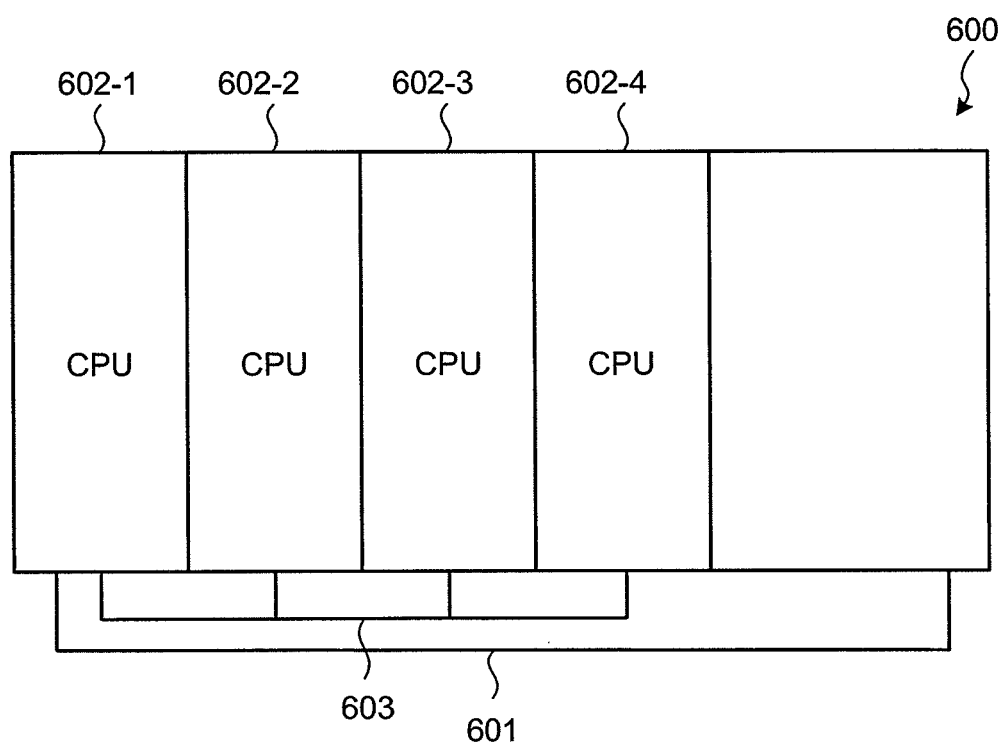
Figures 1, 11:
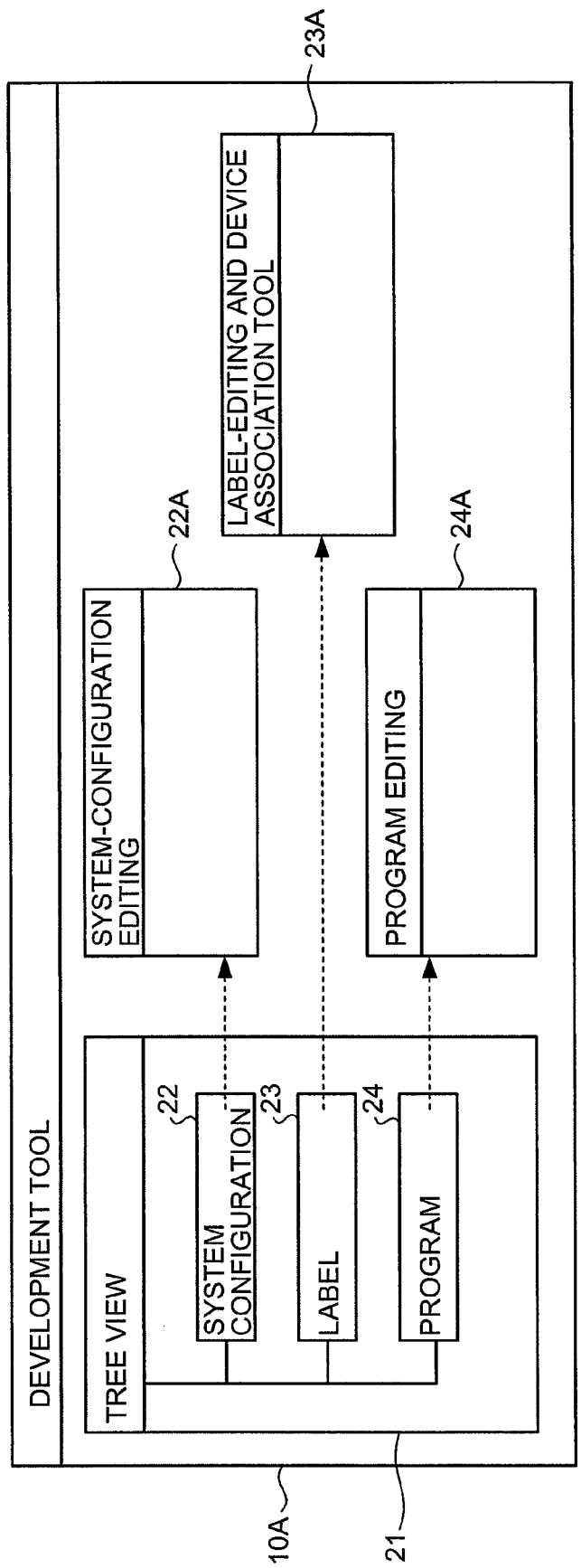
Figures 2, 11:
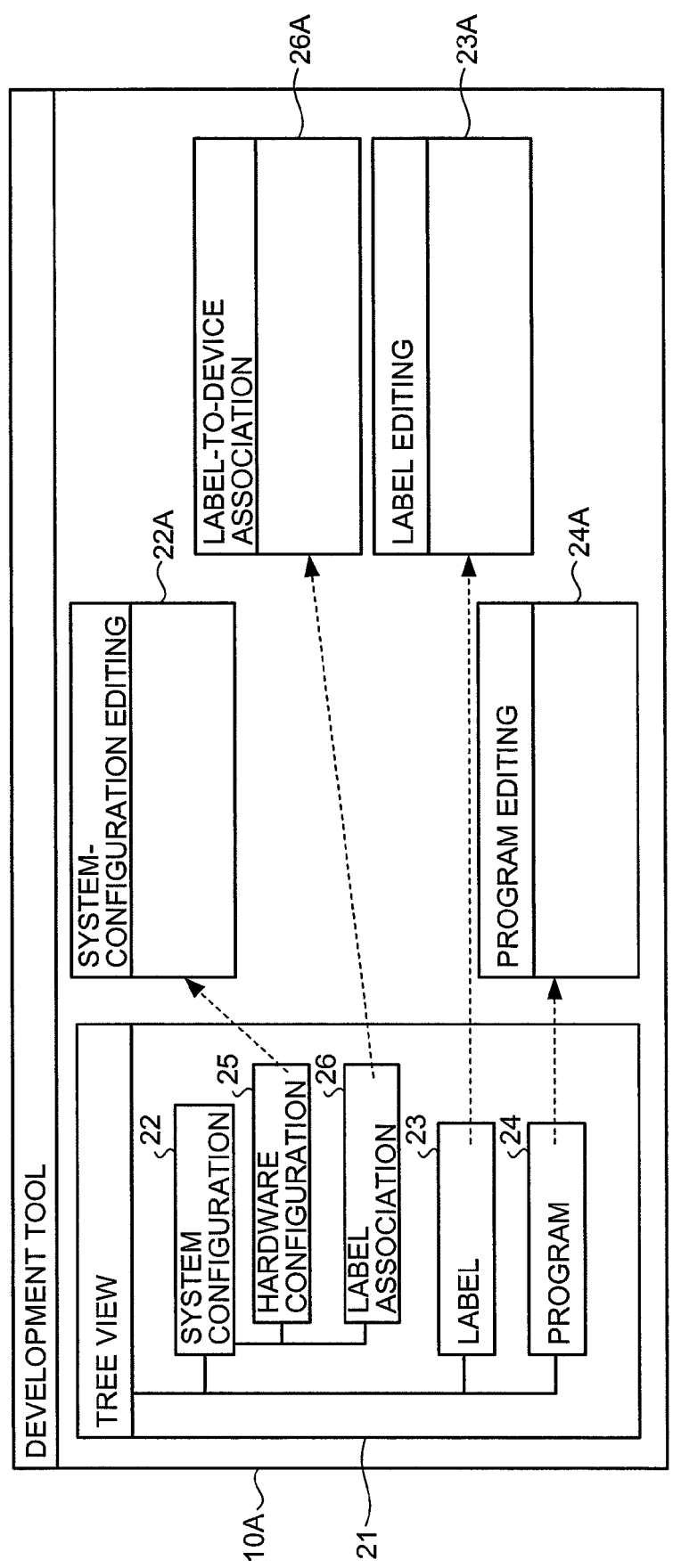

After the programming of the control program to be processed by the PLC or the CPU is completed, the label is associated with a real device (step S14). FIG. 11-1 to FIG. 11-2 are schematics of configurations on the respective display screens of the development tool when the label is associated with the real device. FIG. 11-1 is a schematic of how a label is associated with a real device using the label editing tool, and FIG. 11-2 is a schematic of how a label is associated with a real device using another tool. The association of the label with the real device includes two cases. One of the cases, as shown in FIG. 11-1, is such that the operation is executed by a label-editing and device association tool 23B in which a device associating function is given to an editing tool that is associated with the label 23 in the tree view 21. The other case, as shown in FIG. 11-2, is such that a label is associated with a real device by providing dedicated window, dialog, editor, and tool (hereinafter, "label-to-device association tool") 26A which is separately provided from the label editing tool 23A. In the case of FIG. 11-2, components such as a hardware configuration 25 and a label association 26 are provided below the system configuration 22 in the tree view 21. When the hardware configuration 25 is selected, the system-configuration editing tool 22A is started, while when the label association 26 is selected, then the label-to-device association tool 26A is started. Both of them may be used as the development tool 10A.

Lastly, the created program is compiled to be downloaded to a real machine (step S15), and the programming process of the program to be incorporated in the PLC or the MC is ended.

The programming for the PLC or the CPU is simply performed in the above manner. However, when the development tool 10A is used, a program for the link control system in which a plurality of PLCs are connected to each other by the FA network or for the multi-CPU control system formed with the PLC and the MC each having the multi-CPU configuration can be developed as explained in the following embodiments.

First Embodiment

In the first embodiment, a programming support apparatus capable of associating a label of a control program for a plurality of PLCs that form the link control system with a real device is explained below. In the following, a control system having two PLCs connected to each other via the network is exemplified as the link control system.

Figure 12:
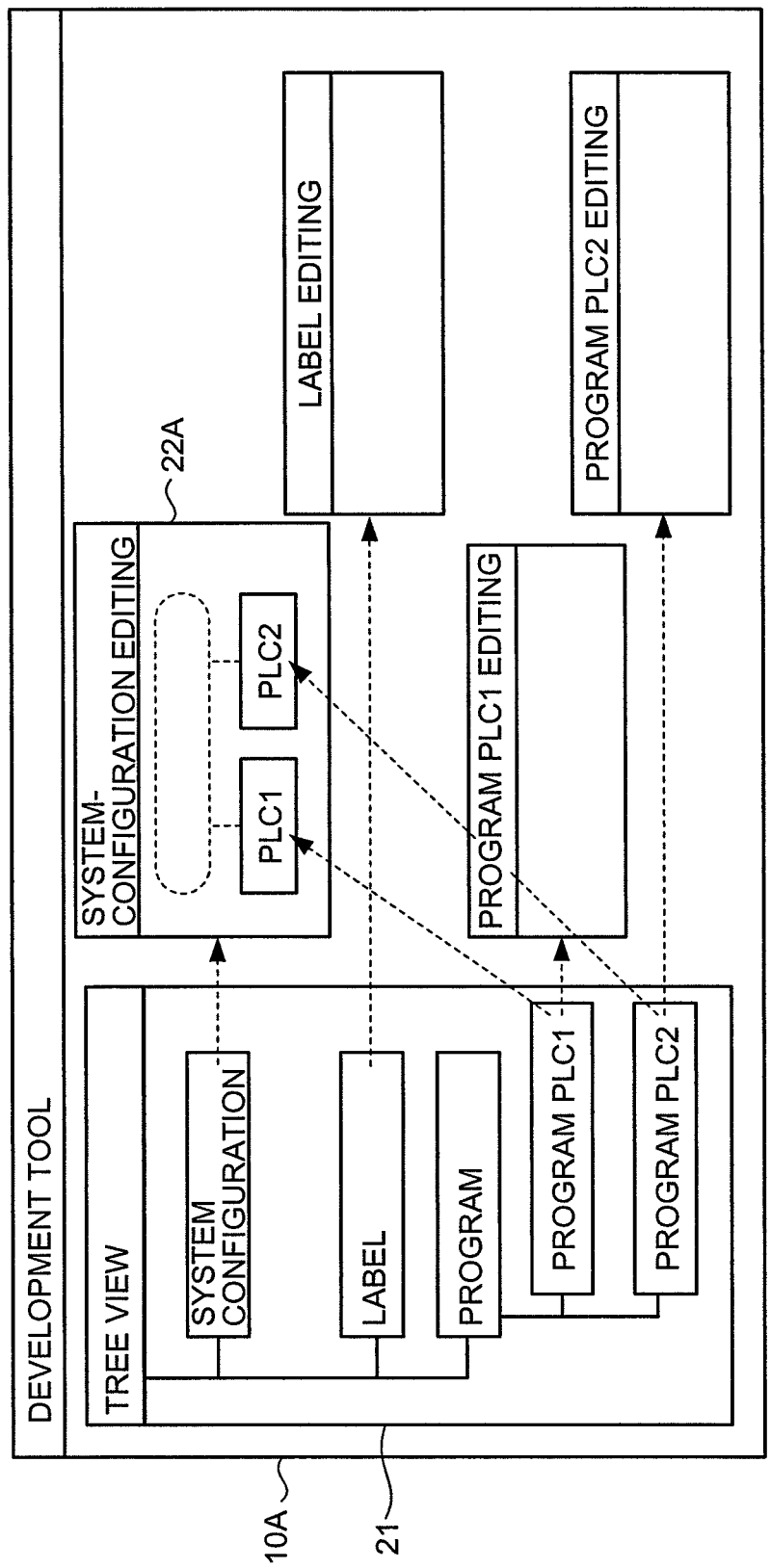
FIG. 12 is a schematic of one example of the configuration on a display screen of the development tool in which the system configuration is set.

The procedure of programming of the control program for PLCs that form the link control system is explained below. As shown at step S11 in the flowchart of FIG. 10, the system configuration is set first. FIG. 12 is a schematic of one example of the configuration on a display screen of the development tool in which the system configuration is set. As explained above, the system configuration such that two PLCs are connected to each other via the network is set in the system-configuration editing tool 22A.

Figure 13:
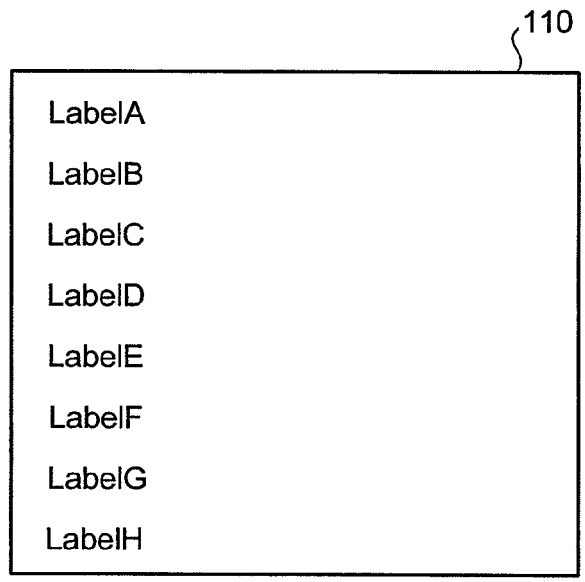
FIG. 13 is a schematic of one example of a created label table.

At step S12, the label is edited. The label includes a label only used in a control program for PLC1 (hereinafter, "program PLC1"), a label only used in a control program for PLC2 (hereinafter, "program PLC2"), and a label for data exchanged between the PLC1 and PLC2, and these labels are created through the same label editing. At the same time, a label table is created. FIG. 13 is a schematic of one example of the created label table. A label table 110 includes created eight labels from "LabelA" to "LabelH".

Figure 14:
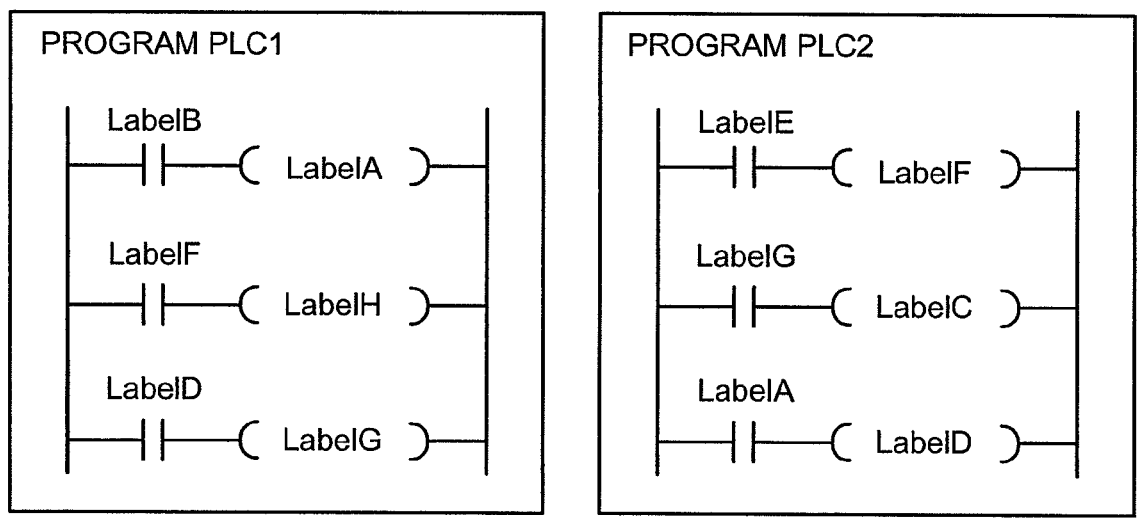
FIG. 14 is a schematic of one examples of created ladder programs.

Furthermore, at step S13, the program is edited. At the same time, the program PLC1 running on the PLC1 and the program PLC2 running on the PLC2 are respectively created. At this time, one of the PLCs that executes the program is specified from the system configuration created by the system-configuration editing tool 22A, and the program is created. More specifically, the PLCs are specified so that the program PLC1 is executed by the PLC1 in the system configuration created by the system-configuration editing tool 22A and the program PLC2 is executed by the PLC2 in the system configuration created by the system-configuration editing tool 22A. The same label table created at step S12 is referenced upon description of the program PLC1 and also description of the program PLC2. Accordingly, the label for data to be exchanged between the PLC1 and the PLC2 can be handled by using the same label name. FIG. 14 is a schematic of one examples of created ladder programs. As shown in this figure, the labels in the label table of FIG. 13 created at step S12 are used to create two ladder programs for the PLC1 and the PLC2.

Each programming of the control programs to control the respective PLCs which form the control system is completed, and then the label is associated with the real device at step S14. The programming support method which is the process of associating the label with the real device is explained in detail below.

Figure 15:
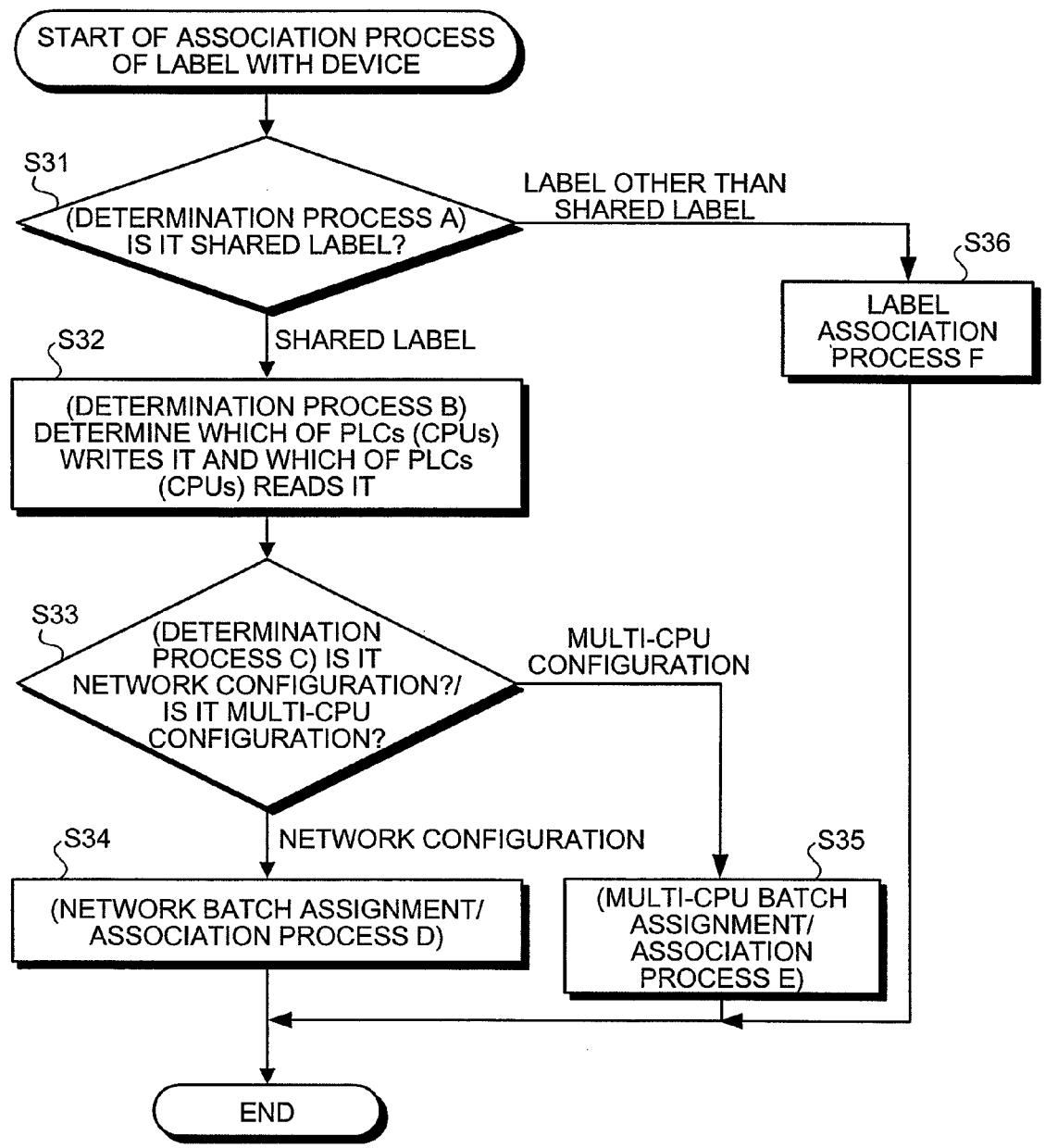
FIG. 15 is a flowchart of one example of a procedure for associating the label with the real device.

FIG. 15 is a flowchart of one example of a procedure for associating the label with the real device. The process of associating the label with the real device is executed by the label-to-device association processor 16 of FIG. 8.

At first, the label-to-device association processor 16 performs a determination process A of determining that a label is used for programming and of further determining whether the label is a shared label to be associated with a device shared by a plurality of PLCs (or by a plurality of CPUs when explained in a second embodiment) or whether the label is a label to be associated with any other device (step S31). The processor that performs this determination process is described "shared-label extracting unit" in claims.

Next, when it is determined at step S31 that the label is a shared label, the label-to-device association processor 16 performs a determination process B of determining which of the PLCs (CPUs) writes the shared label and which of the PLCs (CPUs) reads the shared label (step S32). The processor that performs this determination process is described "shared-label write/read information generating unit" in claims.

Thereafter, the label-to-device association processor 16 performs a determination process C of determining, from the system configuration, whether the PLCs (CPUs) related to the shared label have a network configuration or a multi-CPU configuration in which the CPUs are connected to each other on one base unit (step S33). The processor that performs this determination process is described "system-configuration determining unit" in claims.

When it is determined at step S33 that the PLCs have the network configuration, the label-to-device association processor 16 performs a network batch assignment/association process D in which assignment in a link device and association of each shared label with the link device are performed at a time (step S34), and the label-to-device association process is ended. The processor that performs the label-to-device association process is described "device batch assigning/associating unit" in claims.

When it is determined at step S33 that the CPUs have the multi-CPU configuration, the label-to-device association processor 16 performs a multi-CPU batch assignment/association process E in which assignment in a shared refresh device and association of each shared label with the shared refresh device are performed at a time (step S35), and the label-to-device association process is ended. It is noted that the multi-CPU batch assignment/association process E performed at step S35 is explained later in the second embodiment.

When it is determined at step S31 that the label is not the shared label, the label-to-device association processor 16 performs a label association process F in which the label is associated with an address of a device (step S36), and the label-to-device association process is ended.

The processes A to F are explained in further detail below.

(Determination Process A)

Figure 16:
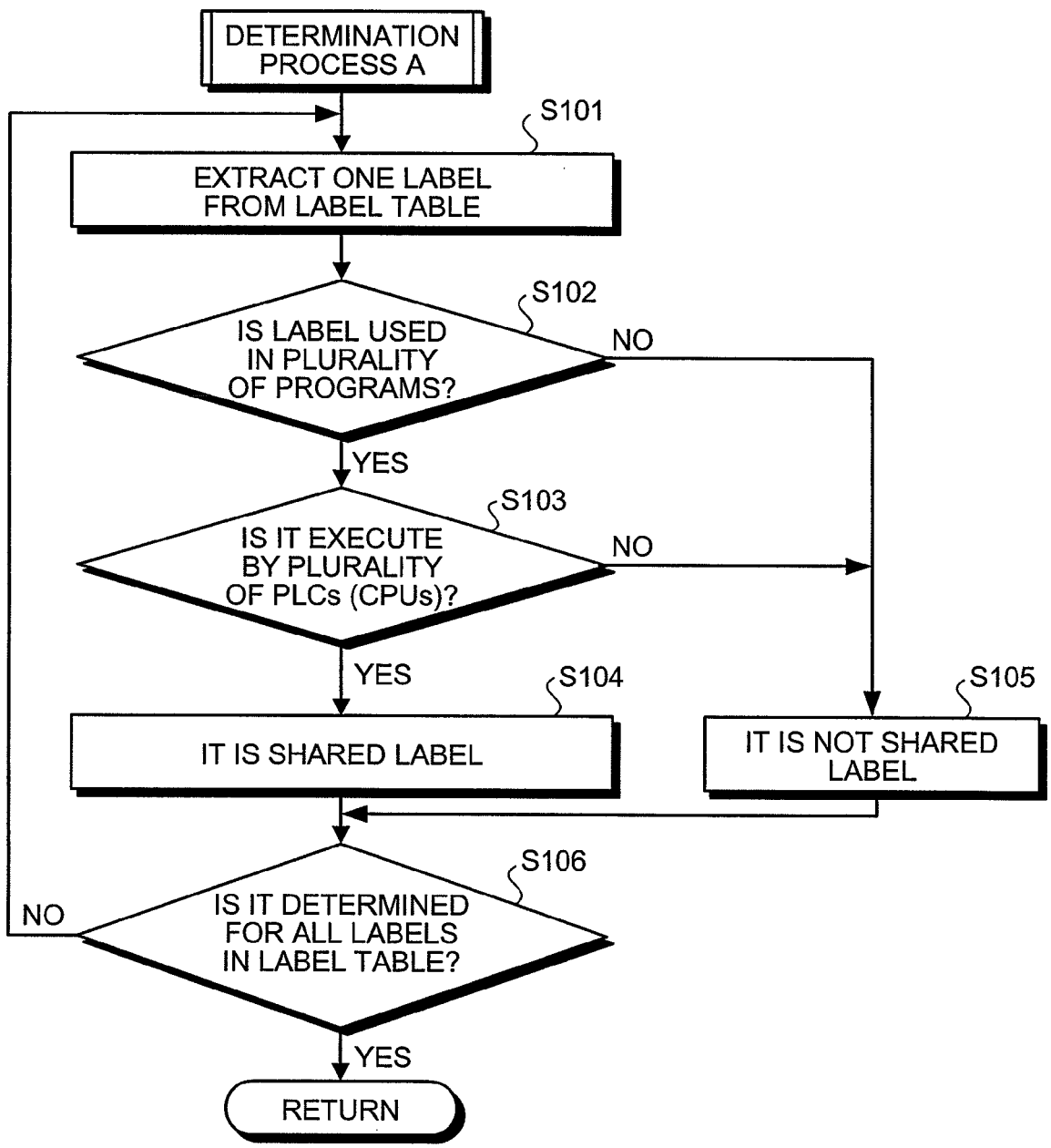
FIG. 16 is a flowchart of a procedure for a determination process A.

The determination process A of determining whether the label is the shared label is explained below with reference to the flowchart of FIG. 16. At first, the label-to-device association processor 16 extracts one label from the label table created at step S12 (step S101). Then, it is determined whether the extracted label is used in a plurality of programs by referring to the created programs (step S102). When the label is used in the programs (Yes at step S102), it is further determined whether the label is executed by a plurality of PLCs (CPUs) (step S103). When the label is executed by the PLCs (CPUs) (Yes at step S103), then it is determined that the label is the shared label (step S104). The label determined as the shared label is stored in a shared label table. On the other hand, when it is determined at step S102 that the label is not used in the programs (No at step S102), or when it is determined at step S103 that the label is not used in the PLCs (CPUs) (No at step S103), then it is determined that the label is not the shared label (step S105). The label determined not to be the shared label is stored in a non-shared label table.

Thereafter, the label-to-device association processor 16 determines whether the determination is made on all the labels in the label table (step S106). When not all the labels are determined (No at step S106), the process returns to step S101, where the process is similarly executed to other labels in the label table. When the determination is made on all the labels (Yes at step S106), then the determination process A is ended, and the process returns to FIG. 15. The shared label table and the non-shared label table are created through the determination process A.

The specific example is explained below with reference to the label table 110 of FIG. 13 and the programs of FIG. 14. For example, at first, "LabelA" is extracted from the label table 110 of FIG. 13, and it is determined from the programs of FIG. 14 whether the LabelA is used in the program PLC1 and the program PLC2. It is determined here that the LabelA is used in the program PLC1 and the program PLC2, and thus, it is further determined whether the LabelA is executed by a plurality of PLCs. Referring to FIG. 14, it is clear that the program PLC1 is executed by the PLC1 and the program PLC2 is executed by the PLC2, and thus, "LabelA" is defined as the shared label.

Figure 17:
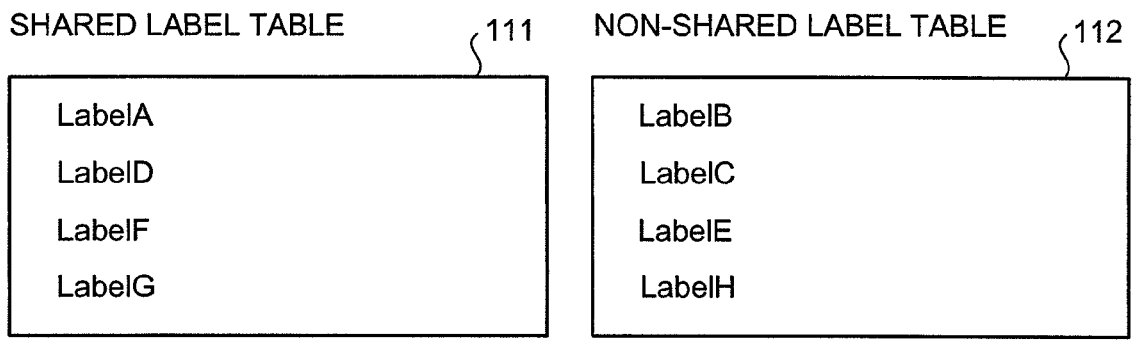
FIG. 17 is a schematic of one examples of a shared label table and a non-shared label table.

Next, another label "LabelB" is extracted from the label table 110 of FIG. 13, and it is determined from the programs of FIG. 14 whether the LabelB is used in the program PLC1 and the program PLC2. It is determined here that the LabelB is used only in the program PLC1, and thus, it is determined that "LabelB" is not the shared label. The rest of the labels LabelC to LabelH in the label table 110 of FIG. 13 are determined in the above manner. As a result, a shared label table 111 and a non-shared label table 112 are created as shown in FIG. 17.

(Determination Process B)

Figure 18:
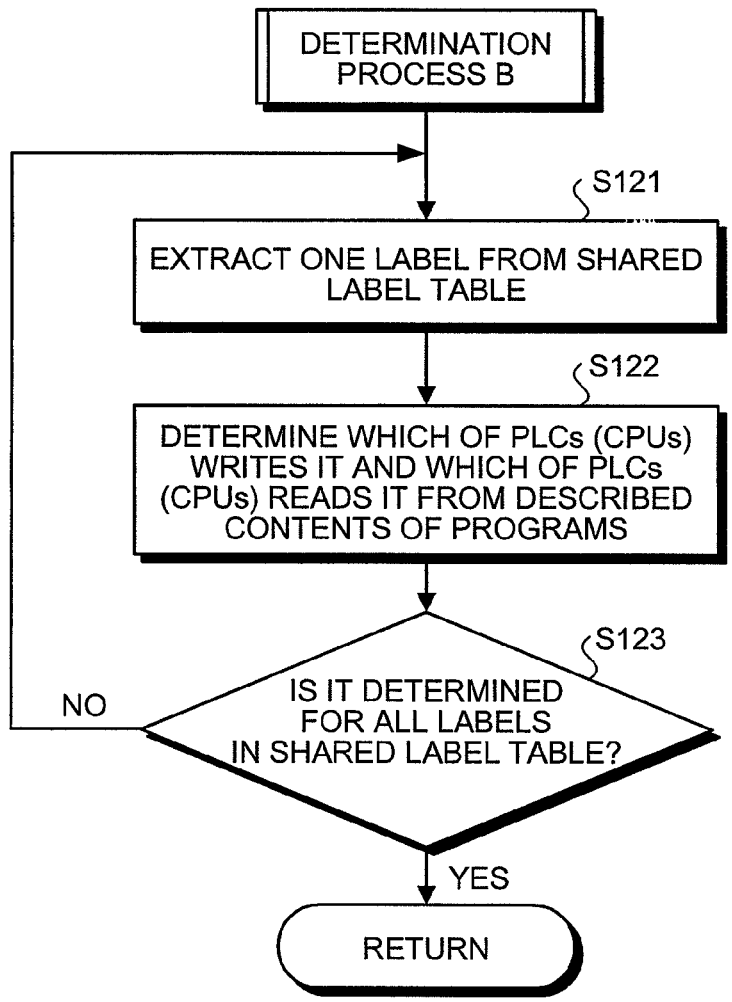
FIG. 18 is a flowchart of a procedure for a determination process B.

The determination process B of determining which of the PLCs (CPUs) writes the label and which of the PLCs (CPUs) reads the label is explained below with reference to the flowchart of FIG. 18. At first, the label-to-device association processor 16 extracts one label from the shared label table created at the determination process A (step S121). Then, it is determined which of the PLCs (CPUs) writes the label and which of the PLCs (CPUs) reads the label by referring to the described contents of the programs (step S122). It is then determined whether the determination is made on all the labels in the shared label table (step S123). When not all the labels are determined (No at step S123), the process returns to step S121, and the processes are repeatedly executed to all the label in the shared label table. On the other hand, when all the labels are determined (Yes at step S123), the determination process B is ended, and the process returns to FIG. 15. Shared-label write/read information is created through the determination process B.

The specific example is explained below with reference to the programs of FIG. 14 and the shared label table 111 of FIG. 17. For example, at first, the LabelA in the shared label table 111 of FIG. 17 is described in the control program as coil data in the program PLC1. The coil is determined as "write" in the control program (ladder program). In other words, the LabelA is determined as "write" in the program PLC1. Further, the LabelA is described in the control program as contact data in the program PLC2. The contact is determined as "read" in the control program (ladder program). In other words, the LabelA is determined as "read" in the program PLC2. With these steps, it is determined that the LabelA is the label to be written by the PLC1 and also the label to be read by the PLC2. The other labels D, F, and G in the shared label table are processed in the same manner as above. As a result, shared-label write/read information 113 is created as shown in FIG. 19.

(Determination Process C)

At the determination process C of determining the system configuration, by referring to the system configuration created at step S11 of FIG. 10, it is determined that the label is the shared label to be associated with the link device when the PLCs are networked, and that the control system using this label is the link control system. Furthermore, when the CPUs are connected to each other on one base unit, the label is the shared label to be associated with the shared refresh device, and that the control system using this label is the multi-CPU control system. As a result, the shared labels are classified into a link-device association label table and a shared-refresh-device association label table.

The specific example is explained below with reference to the system configuration created by using the system-configuration editing tool 22A of FIG. 12 and the shared-label write/read information of FIG. 19. The LabelA being the first label in the shared-label write/read information of FIG. 19 is determined as the label to be associated with the link device because the PLC1 and the PLC2, both of which uses the label A, are networked in the system configuration in the system-configuration editing tool 22A of FIG. 12. Therefore, as shown in FIG. 20, the LabelA is classified into a link-device association label table 114. The other labels in the shared-label write/read information 113 are processed in the same manner as above. It is noted here that all the labels are classified into the link-device association label table 114 while no labels are classified into a shared-refresh-device association label table 115.

(Network Batch Assignment/Association Process D)

Figure 21:
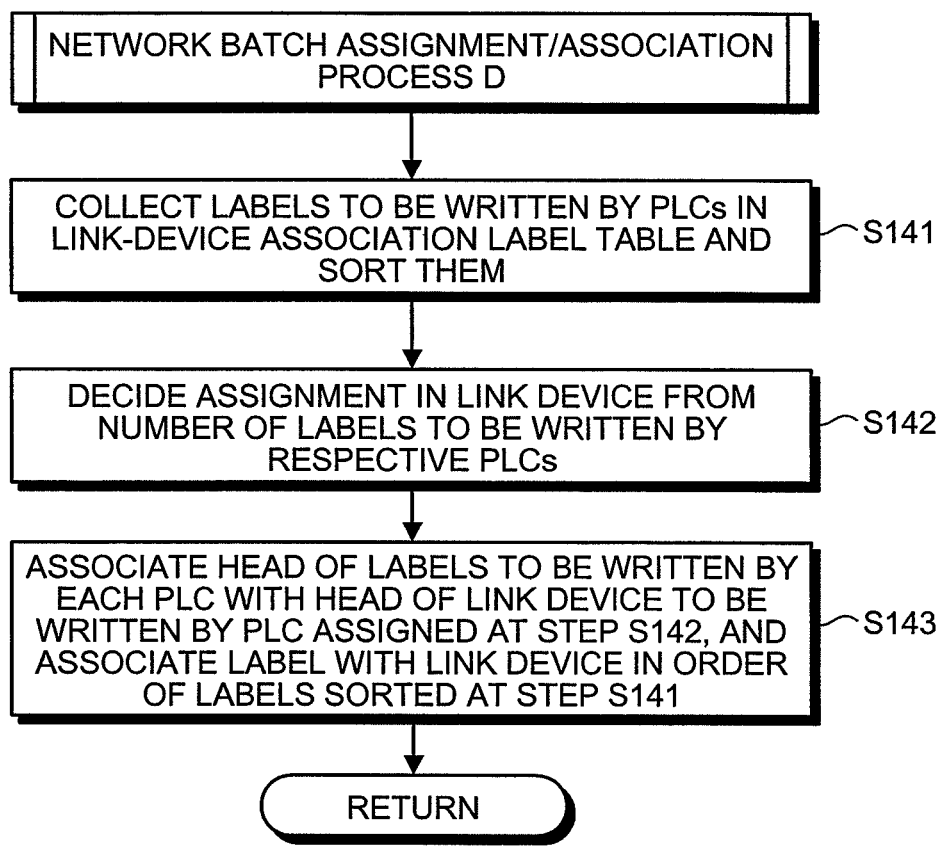
FIG. 21 is a flowchart of a procedure for a network batch assignment/association process D.

The network batch assignment/association process D of simultaneously and collectively associating labels, which are associated with a link device, with devices is explained below with reference to the flowchart of FIG. 21. At first, labels, in the link-device association label table, to be written by the PLCs are collected and sorted for each PLC (step S141). A PLC-writing label classification table is created from the link-device association label table by sorting the labels. When the control system is formed with both the PLC1 and the PLC2, the labels to be written by the PLC1 are collected and sorted, and then the labels to be written by the PLC2 are also collected and sorted.

Next, the created PLC-writing label classification table is used to decide assignment in the link device from each number of labels to be written by the respective PLCs (step S142). When two PLCs are set, the assignment in the link device is decided from the number of labels to be written by the PLC1 and the number of labels to be written by the PLC2.

Thereafter, the head of the labels to be written by each PLC is associated with the head of the link device to be written by the PLC assigned at step S142, and hereinafter, each label is associated with a corresponding link device in the order of the labels sorted at step S141 (step S143). When two PLCs are set, the head of the labels to be written by the PLC1 is associated with the head of the link device to be written by the PLC1 assigned at step S142, and hereinafter, each label is associated with a corresponding link device in the order of the labels sorted at step S141. The same goes for the labels to be written by the PLC2. With these steps, the network batch assignment/association process D is ended, and the process returns to FIG. 15.

FIG. 22 is a schematic of a specific procedure for the network batch assignment/association process D. In FIG. 22, the step number is given to a position corresponding to each of the steps in FIG. 21. At first, based on the link-device association label table 114 shown in FIG. 20, a PLC-writing label classification table 116, in which the labels to be written by the PLCs are collected and sorted for each PLC, is created as a pre-process required to perform assignment in the link device and to associate the shared label with the link device. As shown in FIG. 22, the labels to be written by the PLC1 and the labels to be written by the PLC2 are classified (step S141).

Next, by using the result of sorting the labels in order of the PLCs in the PLC-writing label classification table 116, data on how many points of data is to be written is extracted for each PLC, and the link device is assigned the extracted points of data. The PLC1 writes two points of data, and thus the PLC1 requires two points in the link device. However, the link device has a system restriction in its assignment by unit of 16 points, and thus the points are rounded up to 16 points. Consequently, the 16 points are assigned to B00 to B0F as the link device to be written by the PLC1. The PLC2 also writes two points of data, and thus the points are rounded up to 16 points in the same manner as above, and then, as the link device to be written by the PLC2, the 16 points are assigned to B10 to B1F starting from the address subsequent to that of the link device written by the PLC1 (step S142).

Thereafter, the head address B00 of the link device written by the PLC1, which is the result of assignment, is associated with the head label "LabelA" written by the PLC1 as the result of sorting the labels in the PLC-writing label classification table. And then the address B01 of the link device is associated with the label "LabelG". Furthermore, the head address B10 of the link device written by the PLC2 assigned at step S142 is associated with the head label "LabelD" written by the PLC2 in the PLC-writing label classification table. And then the address B11 of the link device is associated with the label "LabelF".

As for the setting of the assignment in the link device, the same setting is used for the PLCs used in the control system. Thus, the setting of the assignment in the link device is commonly used for compiling in the PLCs.

(Label Association Process F)

The label association process F is the association between the label name and the device address explained in Background Art, and association between the label name and the device address is performed on each label other than the shared label by using the same method as the conventional one. The association is performed simply on any device other than the devices having been associated with the labels in the network batch assignment/association process D.

With these steps, the process of associating all the labels with the real devices is completed, which makes it possible to perform the compiling process at step S15 of FIG. 10 required to download both the program PLC1 and the program PLC2 into the real machines PLC1 and PLC2 respectively. Although the example where two PLCs are connected to the FA network is explained above, the number of PLCs is not limited by this number, and thus the present invention is also applicable to the case where a plurality of PLCs is connected to each other via the FA network.

According to the first embodiment, the program using the same label name for data exchange between PLCs can be created, and the association of the label with the link device and the assignment in the link device can be automatically performed. Therefore, the creation of the program using the same label name between PLCs allows efficient device development. It is also possible to realize development of the control system in which data is exchanged between the PLCs at a high speed using the function of the link device.

Second Embodiment

In the first embodiment, the case where the batch association process of the shared label for programming of the control programs for PLCs in the link control system is explained above, while in the second embodiment, the case where the batch association process of the shared label for programming of the control programs for CPUs in the multi-CPU control system is explained below.

Figure 23:
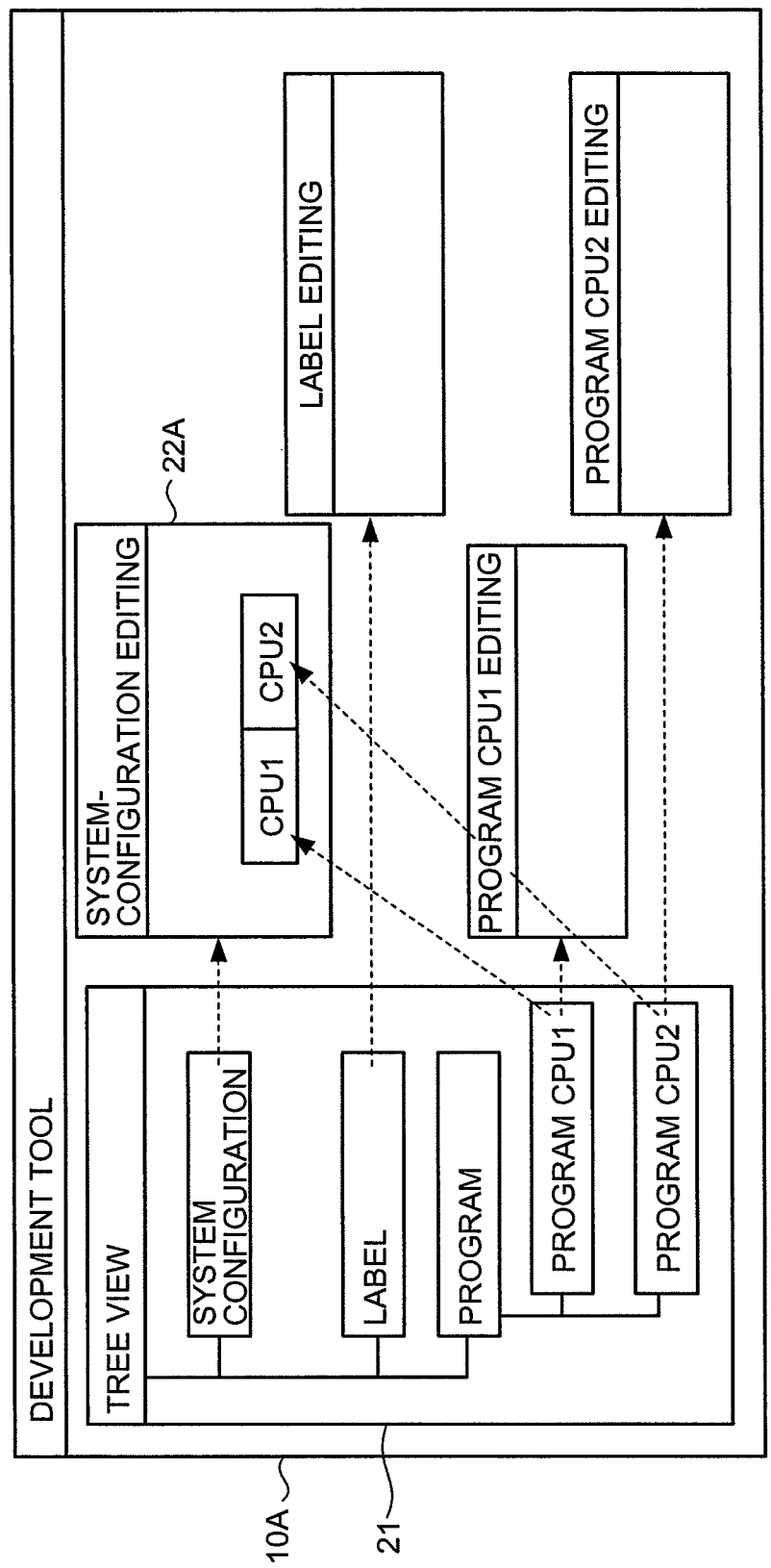
FIG. 23 is a schematic of one example of the configuration on a display screen of the development tool in which the system configuration is set.

The programming is also performed here according to the procedure shown in FIG. 10. At first, as shown at step S11 in the flowchart of FIG. 10, the system configuration is set. FIG. 23 is a schematic of one example of the configuration on a display screen of the development tool in which the system configuration is set. In this figure, the system configuration in which two CPU units are connected to each other on the base unit is set in the system-configuration editing tool 22A.

Figure 24:
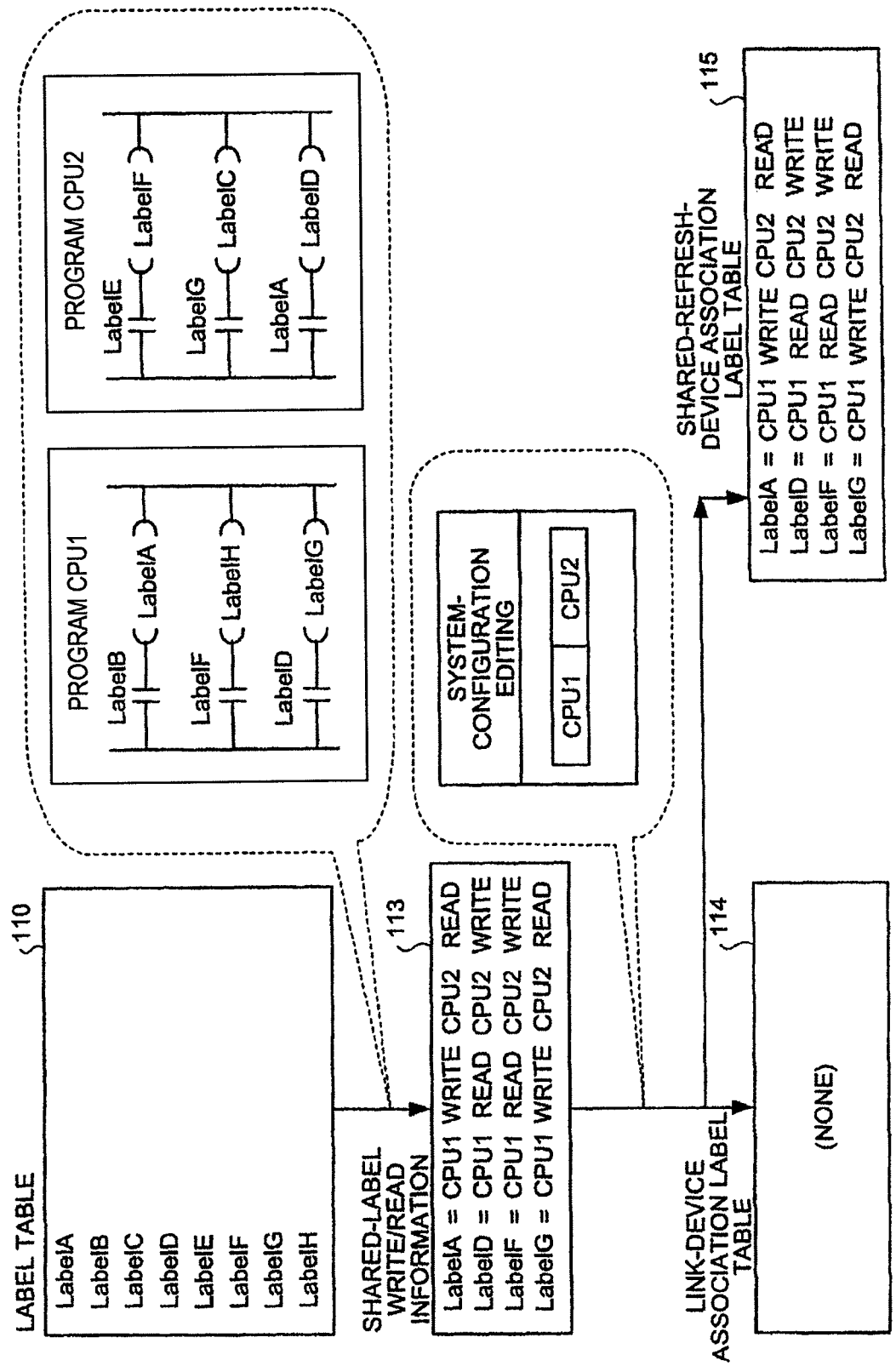
FIG. 24 is a schematic of a specific procedure for a batch assignment/association process of shared labels in the multi-CPU control system.

FIG. 24 is a schematic of a specific procedure for a batch assignment/association process of shared labels in the multi-CPU control system. The batch assignment/association process of the shared labels is explained below with reference to FIG. 24. The system configuration is set as shown in FIG. 23, and then the label is edited at step S12 of FIG. 10. The label includes a label only used in a control program for a CPU1 (hereinafter, "program CPU1"), a label only used in a control program for a CPU2 (hereinafter, "program CPU2"), and a label for data to be exchanged between the CPU1 and CPU2, and these labels are created through the same label editing. Accordingly, it is possible to handle the label of the data to be exchanged between the CPU1 and the CPU2 using the same label name. At the same time, a label table is created. As shown in the label table 110 of FIG. 24, the eight labels from "LabelA" to "LabelH" are created.

Furthermore, the program is edited at step S13 of FIG. 10. At this time, a program running on the CPU1 and a program running on the CPU2 are individually created. Upon creation, it is specified which of the CPUs in the system configuration executes each program, and creates the program. More specifically, the CPUs are specified so that the program CPU1 is executed by the CPU1 in the system configuration and the program CPU2 is executed by the CPU2 therein. The same label table is referenced in both cases where the program CPU1 is described and where the program CPU2 is described. Accordingly, the label for data to be exchanged between the CPU1 and the CPU2 can be handled using the same label name. FIG. 24 shows one examples of created ladder programs. As shown in this figure, the labels created at step S12 are used to create two ladder programs for the CPU1 and the CPU2 (program CPU1 and program CPU2).

Each programming of the control programs to control the respective CPUs that form the control system is completed, and then the label is associated with the real device at step S14 of FIG. 10. The process of associating the label with the real device is almost the same as that explained with reference to FIG. 15 according to the first embodiment. However, because the shared refresh device is used in the second embodiment, the multi-CPU batch assignment/association process E at step S35 is executed instead of the network batch assignment/association process D at step S34. Therefore, explanation of the portions corresponding to these of the first embodiment is simplified while portions different from these of the first embodiment are explained in detail below.

At first, the label-to-device association processor 16 determines that a label is used for programming, and further determines whether the label is a shared label to be associated with a device shared between a plurality of CPUs. As a result, when the label is a shared label, it is determined which of the CPUs writes the shared label and which of the CPUs reads the shared label. The result is shown in the shared-label write/read information 113 of FIG. 24. Thereafter, it is determined from the system configuration whether a plurality of CPUs related to the shared labels has a network configuration or a multi-CPU configuration in which the CPUs are connected to each other on one base unit, and the shared labels are classified into the link-device association label table 114 or into the shared-refresh-device association label table 115. It is noted in this case that all the labels are classified into the shared-refresh-device association label table 115 while no labels are classified into the link-device association label table 114 (steps S31 to S33 of FIG. 15).

(Multi-CPU Batch Assignment/Association Process E)

Figure 25:
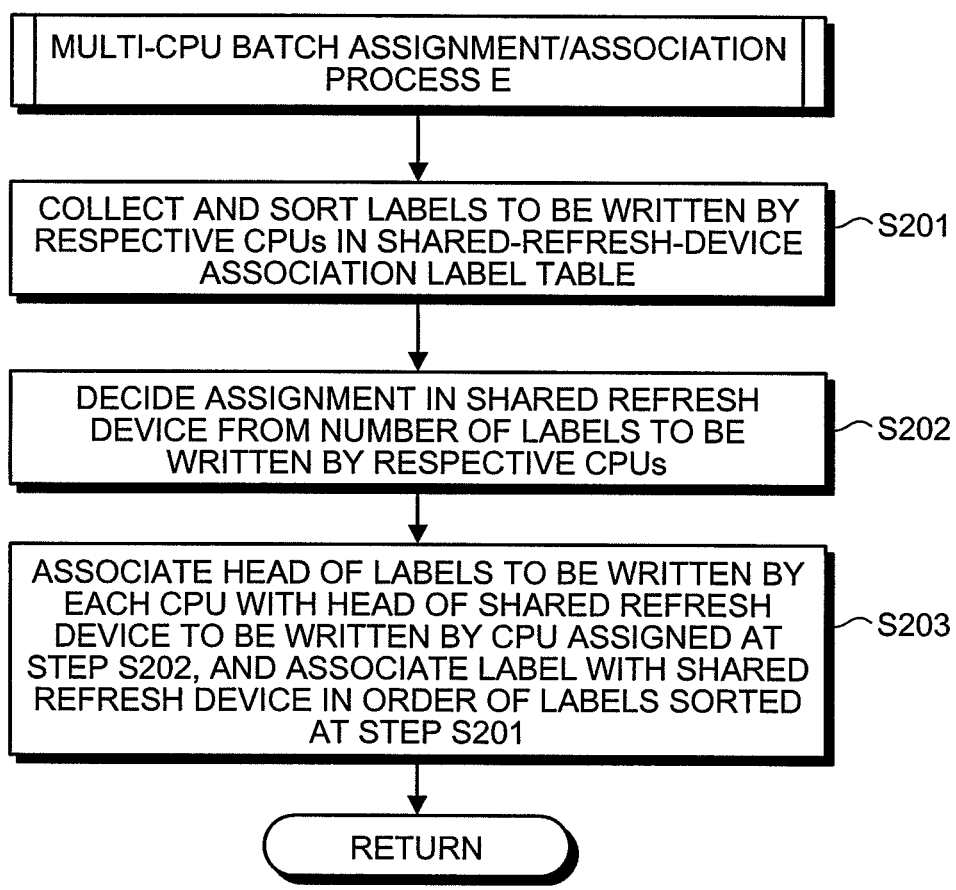
FIG. 25 is a flowchart of a procedure for a multi-CPU batch assignment/association process E.

At step S33 of FIG. 15, the shared label is classified into the shared-refresh-device association label table, and thereafter, the multi-CPU batch assignment/association process E at step S35 is executed. The multi-CPU batch assignment/association process E of simultaneously and collectively associating labels, which are associated with a shared refresh device, with devices is explained below with reference to the flowchart of FIG. 25. At first, labels, in the shared-refresh-device association label table, to be written by the CPU units are collected and sorted by each CPU unit (step S201). A CPU-writing label classification table is created from the shared-refresh-device association label table by sorting the labels therein. When the control system is formed with both the CPU1 and the CPU2, the labels to be written by the CPU1 are collected and sorted, or the labels written by the CPU2 are also collected and sorted.

Next, the created CPU-writing label classification table is used to decide assignment in the shared refresh device from the number of labels to be written by the respective CPUs (step S202). When two CPUs are set, the assignment in the shared refresh device is decided from the number of labels to be written by the CPU1 and the number of labels to be written by the CPU2.

Thereafter, the head of the labels to be written by each CPU unit is associated with the head of the shared refresh device to be written by the CPU unit assigned at step S202, and hereinafter, each label is associated with a corresponding shared refresh device in the order of the labels sorted at step S201 (step S203). When two CPUs are set, the head of the labels to be written by the CPU1 is associated with the head of the shared refresh device to be written by the CPU1 assigned at step S202, and hereinafter, each label is associated with a corresponding shared refresh device in the order of the labels sorted at step S201. The same goes for the labels to be written by the CPU2. With these steps, the multi-CPU batch assignment/association process E is ended, and the process returns to FIG. 15. It is noted that the processor that performs the multi-CPU batch assignment/association process E is described "device batch assigning/associating unit" in claims.

Figure 26:
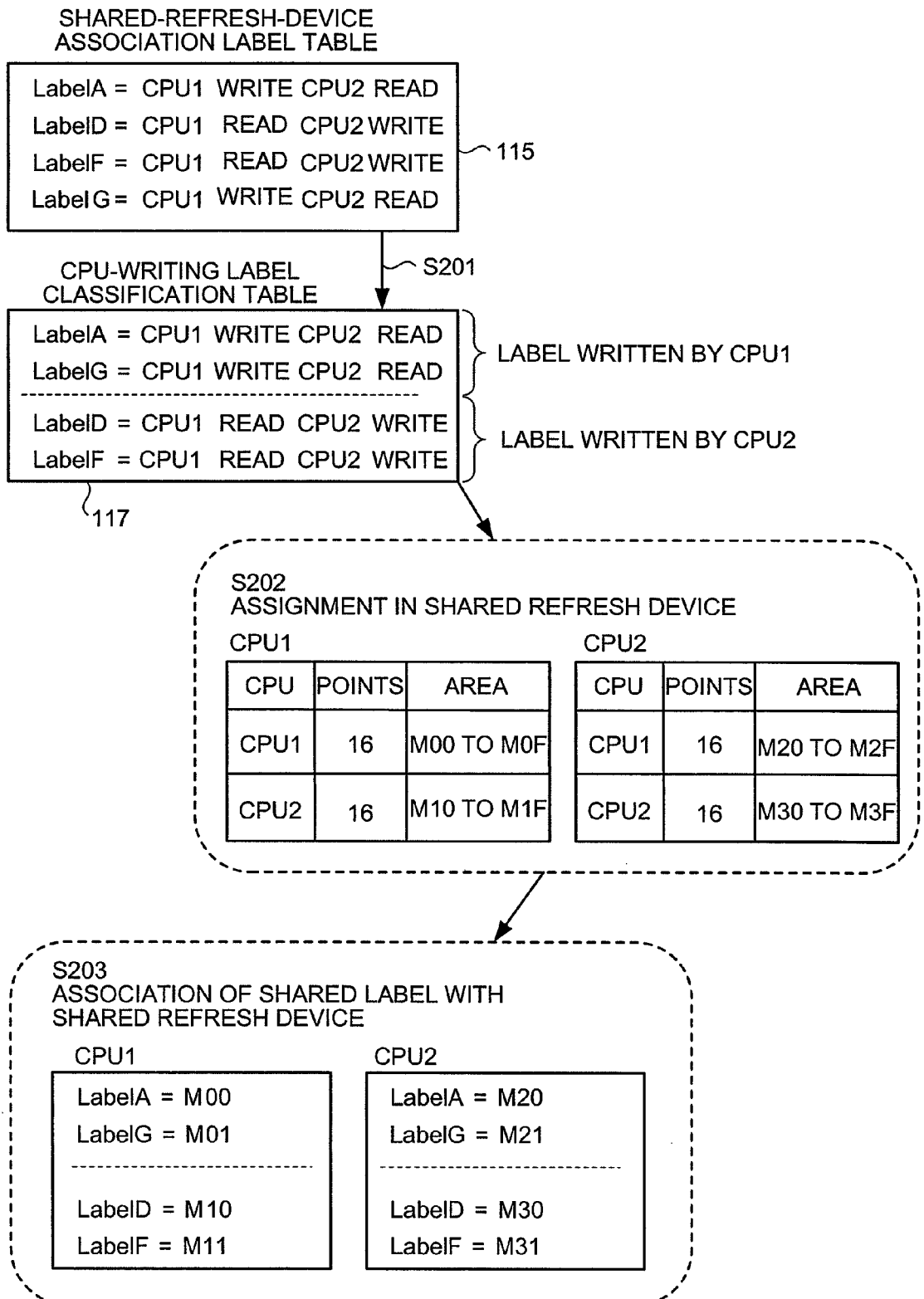
FIG. 26 is a schematic of a specific procedure for the multi-CPU batch assignment/association process E.

FIG. 26 is a schematic of a specific procedure for the multi-CPU batch assignment/association process E. In FIG. 26, the step number is given to a position corresponding to each of the steps in FIG. 25. At first, based on the shared-refresh-device association label table 115, a CPU-writing label classification table 117, in which the labels to be written by the CPUs are collected and sorted, is created as a pre-process required to perform assignment in the shared refresh device and to associate the shared label with the shared refresh device. As shown in FIG. 26, the labels to be written by the CPU1 and the labels to be written by the CPU2 are classified (step S201).

Next, by using the result of sorting the labels in order of the CPUs in the CPU-writing label classification table 117, data on how many points of data is to be written is extracted for each CPU, and the shared refresh device is assigned the extracted points of data in each CPU. The CPU1 writes two points of data, and thus two points are required as the shared refresh device. However, the shared refresh device has a system restriction in assignment thereof by unit of 16 points, and thus the points are rounded up to 16 points. Consequently, the 16 points are assigned to M00 to M0F in the CPU1 as the shared refresh device to be written by the CPU1. The CPU2 writes two points of data, and thus the points are rounded up to 16 points in the same manner as above, and then, as the shared refresh device to be written by the CPU2, the 16 points are assigned to M10 to M1F starting from the address subsequent to that of the shared refresh device written by the CPU1.

In the CPU2, the same number of points as the assigned points in the CPU1 are also used to perform assignment in the shared refresh device. However, an assignment address may be the same as that of the CPU1 or may be different therefrom. In the CPU2 of this example, the 16 points are assigned to M20 to M2F as the shared refresh device to be written by the CPU1, and as the shared refresh device to be written by the CPU2, the 16 points are assigned to M30 to M3F starting from the address subsequent to that of the shared refresh device written by the CPU1 (step S202).

It is noted that the label association process F is performed after the multi-CPU batch assignment/association process E is performed. Therefore, if the head address to be assigned as the shared refresh device is not particularly specified, automatic assignment is simply started from the same address M00 in both the CPU1 and CPU2, and the label has only to be associated with an address other than M00 in the label association process F.

The case where there is the system restriction in assignment in the shared refresh device by unit of 16 points is explained so far. However, if there is a system restriction in assignment in the shared refresh device by unit of 32 points and if data to be written by the CPU is less than 32 points, then the data is rounded up to 32 points. The same process is also performed when it is assigned by unit of any other points.

Thereafter, in the CPU1, the head address M00 of the shared refresh device written by the CPU1, which is the result of assignment, is associated with the head label LabelA written by the CPU1 as the result of sorting the labels in the CPU-writing label classification table 117. And then the address M01 of the shared refresh device is associated with the label LabelG. Furthermore, the head address M10 of the shared refresh device written by the CPU2 assigned at step S202 is associated with the head label LabelD written by the CPU2 in the CPU-writing label classification table 117. And then the address M11 of the shared refresh device is associated with the label LabelF. In the CPU2, the association is also performed by the same process as above. More specifically, the head address M20 of the shared refresh device written by the CPU1, which is the result of assignment at step S202, is associated with the head label LabelA written by the CPU1 as the result of sorting the labels in the CPU-writing label classification table 117. And then the address M21 of the shared refresh device is associated with the label LabelG. Furthermore, the head address M30 of the shared refresh device written by the CPU2 assigned at step S202 is associated with the head label LabelD written by the CPU2 in the CPU-writing label classification table 117. And then the address M31 of the shared refresh device is associated with the label LabelF.

As the setting of assignment in the shared refresh device, setting of the same number of points needs to be used in the CPUs. However, an assignment address is simply set in each CPU, and thus the setting of assignment in the shared refresh device set by the above process is used for compiling in each CPU.

The subsequent label association process F is the association between the label name and the device address explained in Background Art, and association between the label name and the device address is performed for each label other than the shared label by using the same method as the conventional one. The association is performed simply on any device other than the devices having been associated with the labels in the multi-CPU batch assignment/association process E.

With these steps, the process of associating all the labels with the real devices is completed, which makes it possible to perform the compiling process at step S15 of FIG. 10 required to download both the program CPU1 and the program CPU2 into the real machines CPU1 and CPU2 respectively. Although the example where the two CPU units are mounted on the base unit is explained above, the number of CPU units is not limited by this number, and thus the present invention is also applicable to the case where a plurality of CPU units is mounted on the base unit.

According to the second embodiment, the program using the same label name for data exchange between multiple CPUs can be created, and the association of the label with the shared refresh device and the assignment in the shared refresh device can be automatically performed. Thus, the creation of the program using the same label name between multiple CPUs allows more efficient device development. It is also possible to realize development of the device that exchanges data between the CPUs at a high speed using the function of the shared refresh device.

Third Embodiment

In the third embodiment, the determination process B in the flowchart of FIG. 15 in the case where the multi-CPU control system including two CPUs is constructed and one of the CPUs is a motion CPU is explained below. If a program description language is not ladder language but motion-specific mechanical language, then it is impossible to uniquely decide which of PLCs (CPUs) writes data and which of PLCs (CPUs) reads data, unlike the ladder language. It is therefore necessary to previously set items to specify which of values is to be referenced, for each element of the mechanical language, and a device address or a label is set therein.

Figure 27:
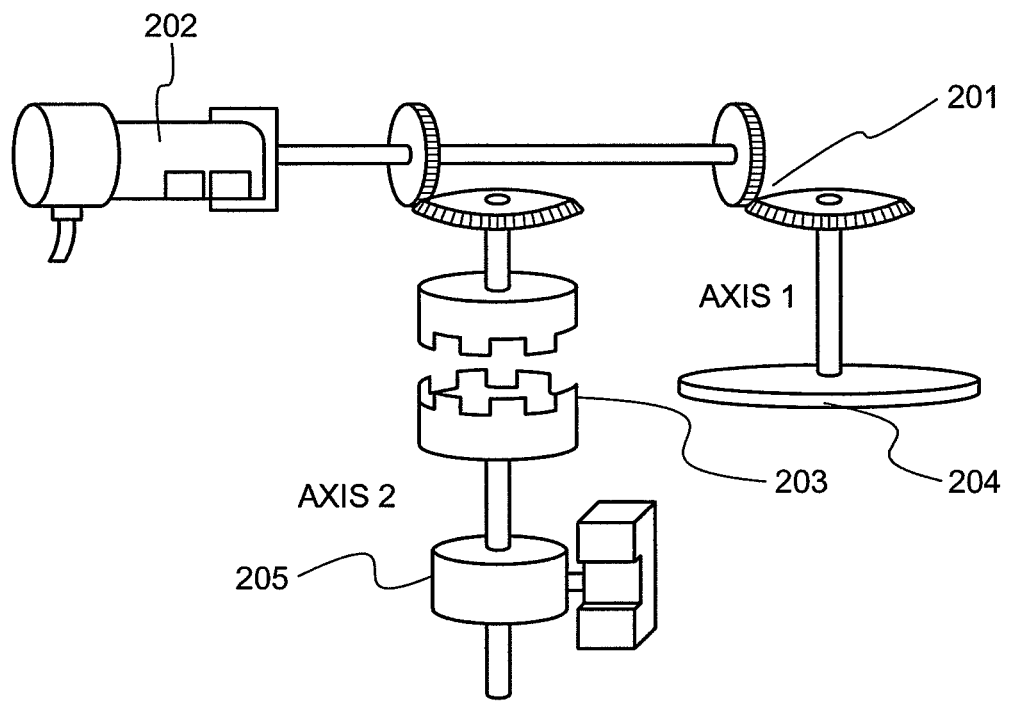
FIG. 27 is a schematic of one example of the configuration according to a third embodiment of the control system.
Figures 1, 28:
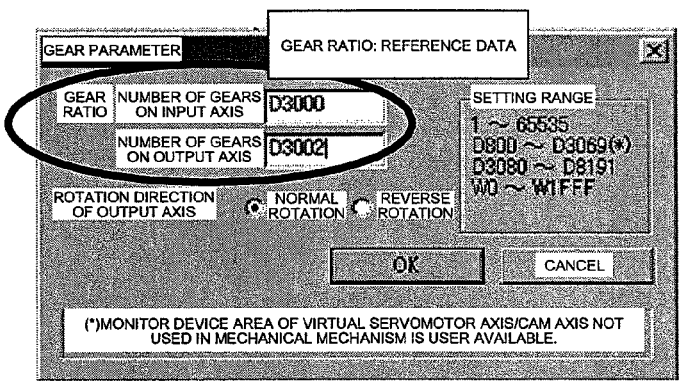
Figures 2, 28:
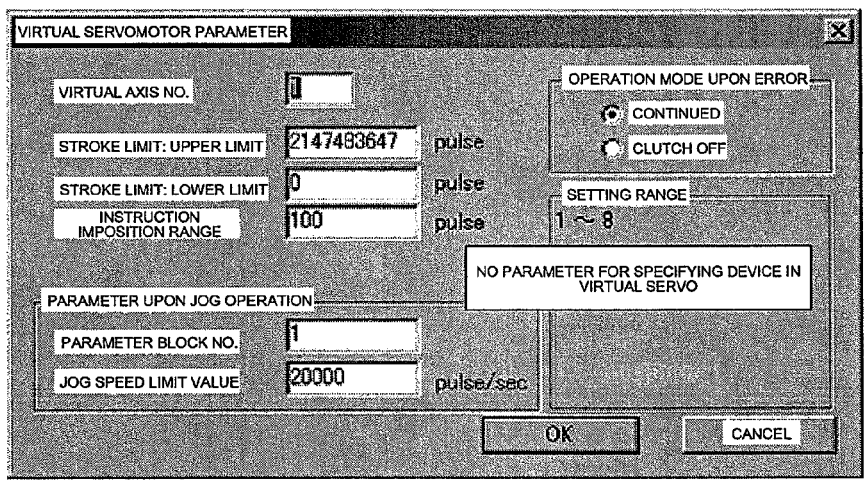
Figures 3, 28:
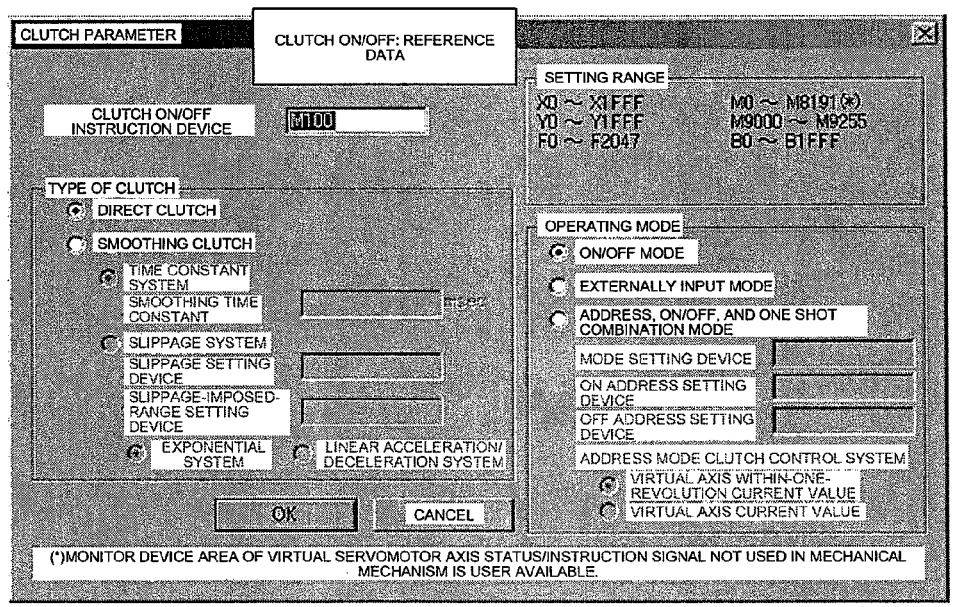
Figures 4, 28:
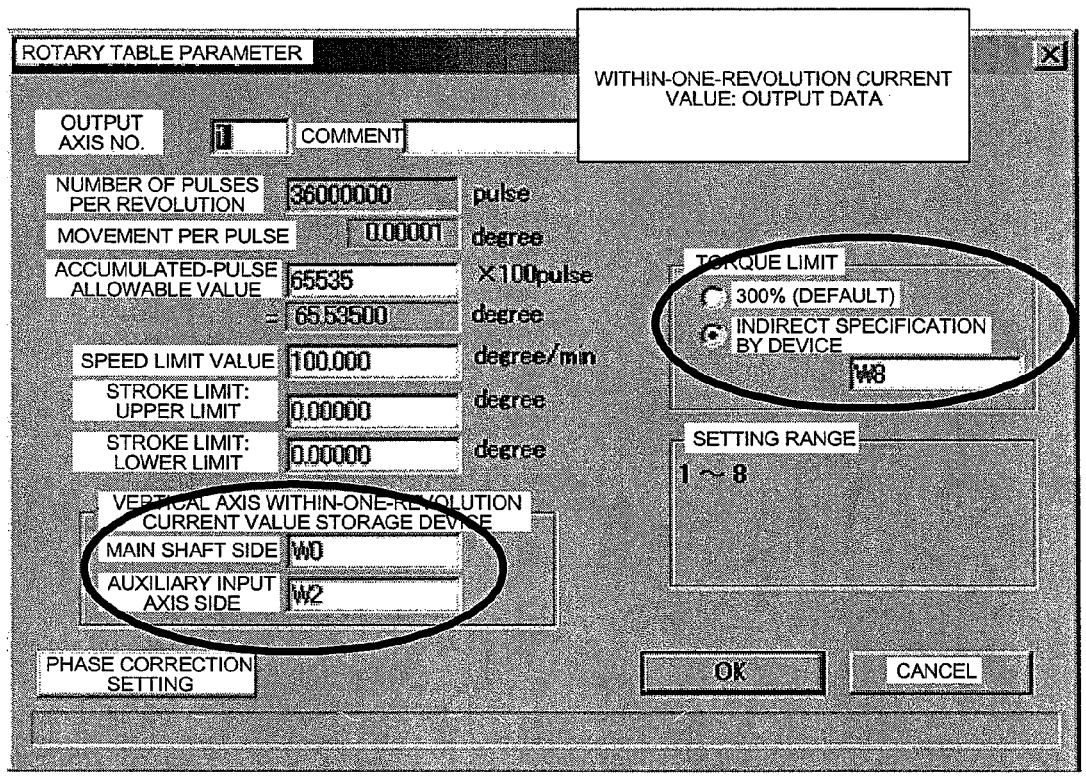
Figures 5, 28:
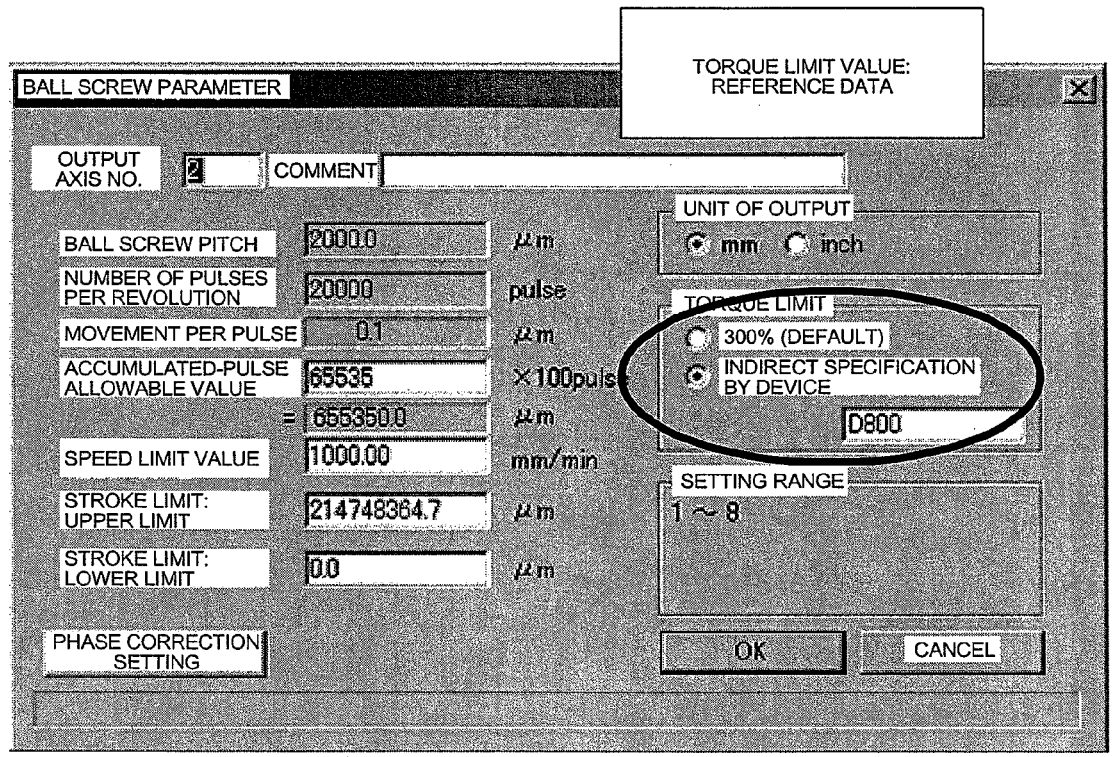

FIG. 27 is a schematic of one example of the configuration according to the third embodiment of the control system, and FIG. 28-1 to FIG. 28-5 are schematics of one examples of parameters of each mechanical element in FIG. 27. As shown in FIG. 27, the control system includes a gear, a virtual servomotor, a clutch, a rotary table, and a ball screw, and FIG. 28-1 to FIG. 28-5 show the parameters of the respective elements.

Figure 4:
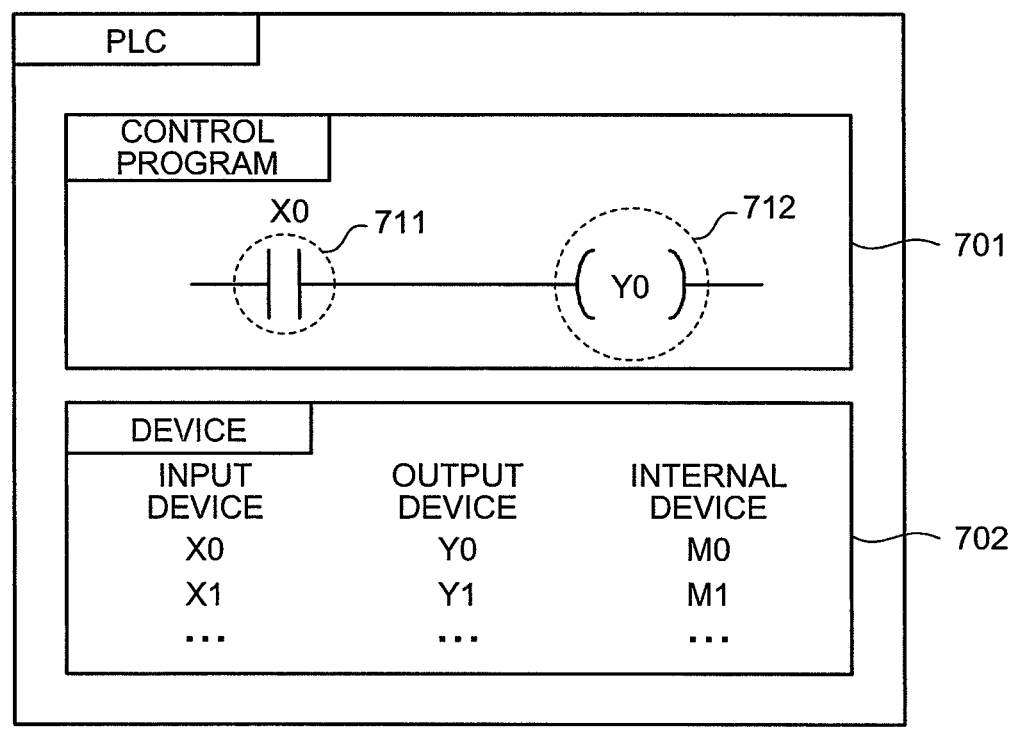
FIG. 4 is a schematic of one example of the conventional control program.
Figure 7:
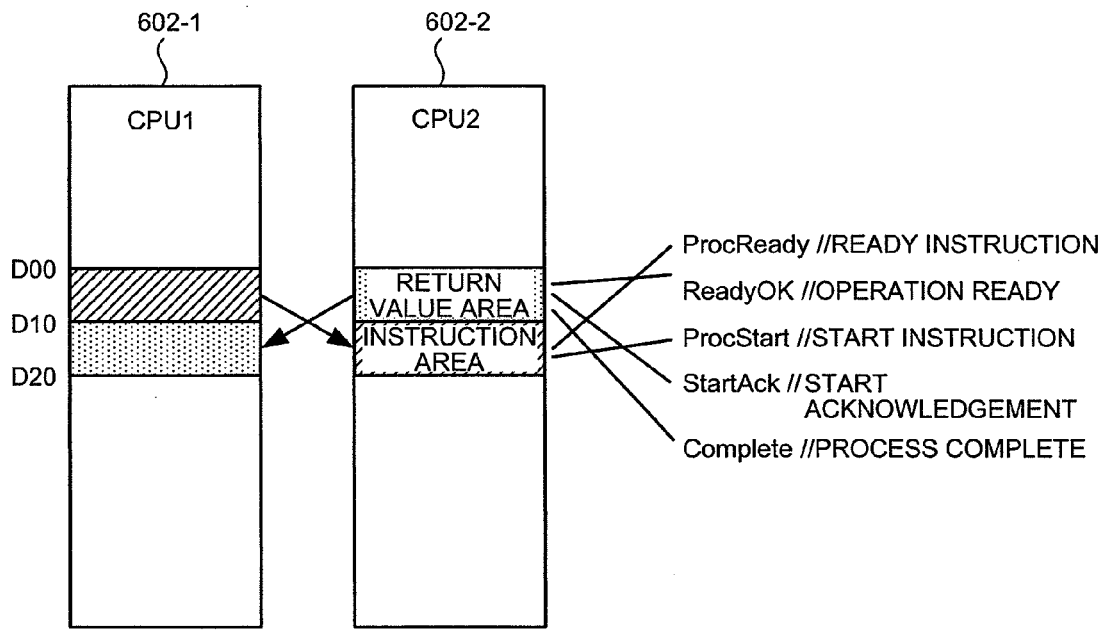
FIG. 7 is a schematic of one example of assignment in labels and assignment of the labels to the shared refresh devices in the multi-CPU control system.

For example, in the case of the gear of FIG. 28-1, "number of gears on input axis" and "number of gears on output axis" as "gear ratio" can be set by referring to the label, and its attribute is set as Read data. In the case of the virtual servomotor of FIG. 28-2, there is no parameter with which a device can be specified. In the case of the clutch of FIG. 28-3, "clutch ON/OFF" can be set by referring to the label, and its attribute is set as Read data. In the case of the rotary table of FIG. 28-4, "virtual axis within-one-revolution current value storage device" can be set by referring to the label, and its attribute is set as Write data. In the case of the ball screw of FIG. 28-5, "torque limit" can be set by referring to the label, and its attribute is set as Read data.

FIG. 29 is a schematic of one example of mechanical-element attribute information in the list form of Write data and Read data for parameters of the mechanical elements in FIG. 28-1 to FIG. 28-5. As shown in the mechanical-element attribute information, an item that can be set by referring to a corresponding label for each mechanical element and its attribute that specifies whether the item is Write or Read are stored therein as a list. FIG. 29 describes the contents explained with reference to FIG. 28-1 to FIG. 28-5.

In the determination process B according to the first and the second embodiments, when the control program is described in the ladder language, determination is made without exception in such a manner that the contact symbol indicates Write and the coil symbol indicates Read. However, when it is described in the mechanical language, the determination is made by referring to the mechanical-element attribute information as shown in FIG. 29.

For example, when the label is used in the clutch ON/OFF parameter, by referring to the mechanical-element attribute information of FIG. 29, it is found that the label is Read in the mechanical language. When the label is used in the within-one-revolution current value of the rotary table, it is found that the label is Write in the mechanical language obtained in the same manner as above. In this manner, by previously specifying the mechanical-element attribute information as shown in FIG. 29 in which Write or Read is specified by referring to a corresponding label for each mechanical element, it is possible to determine whether the label is Write data or Read data, based on the mechanical-element attribute information.

It is noted that the rest of the processes are the same as these explained in the first and the second embodiments and thus explanation thereof is omitted.

According to the third embodiment, by using the mechanical-element attribute information that stores therein items that can be set by referring to respective labels and attributes as to whether each label is Write or Read, it is determined which of CPUs writes the label and which of CPUs reads the label. Therefore, even if the control program is described in motion-specific mechanical language, the association of the label with the shared refresh device and the assignment in the shared refresh device can automatically be performed. As a result, it is possible to realize more efficient device development by creating the program using the same label name between multiple CPUs. It is also possible to realize development of the device that exchanges data between the CPUs at a high speed using the function of the shared refresh device.

Fourth Embodiment

In the fourth embodiment, the case where control programs for two PLCs are to be developed when one control system is constructed by using two PLCs which are networked is explained. Particularly, the case where label tables are separately managed for shared labels and other labels (non-shared labels) is explained below.

Figure 30:
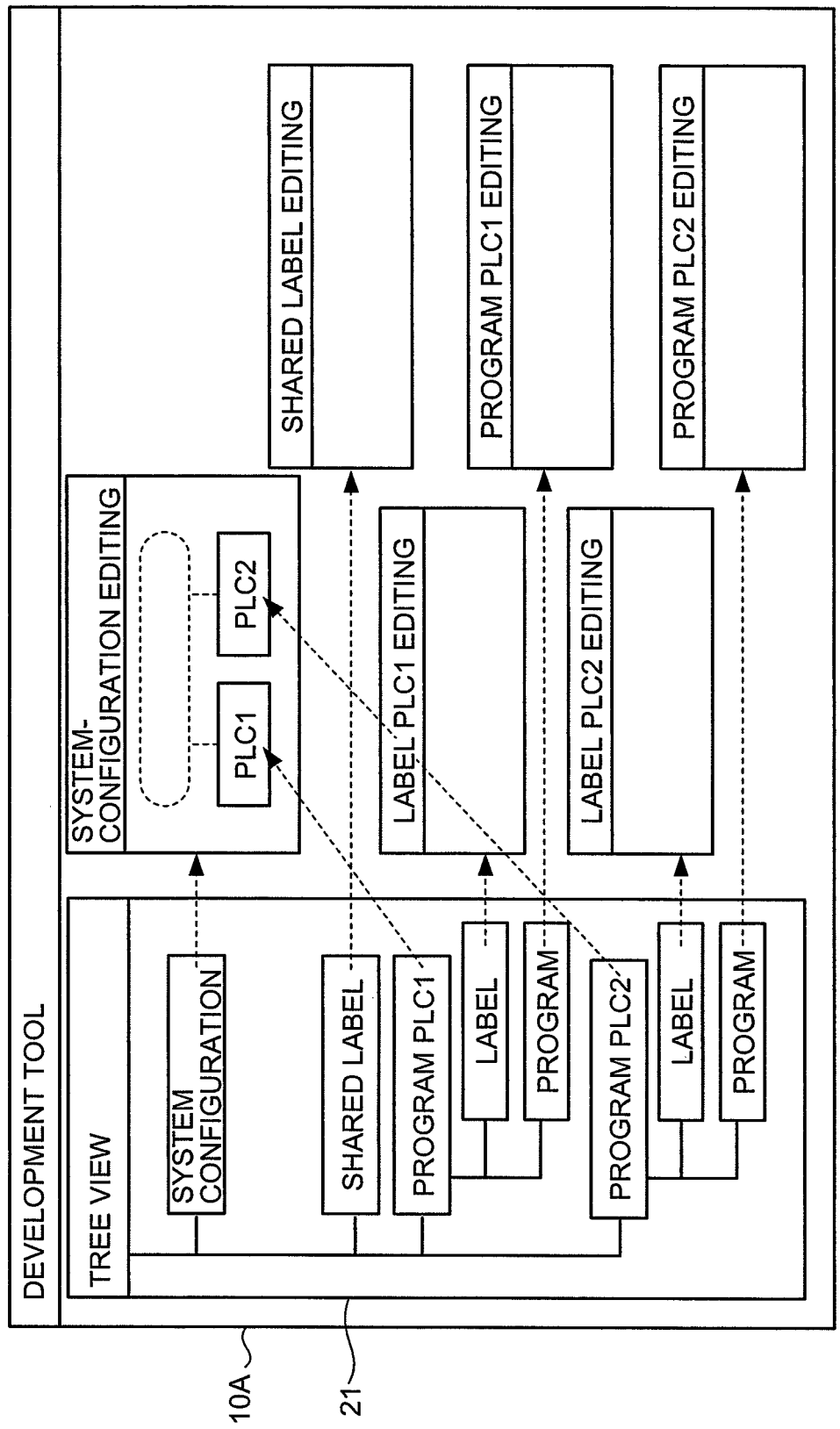
FIG. 30 is a schematic of one example of a label management method in a management tool.

FIG. 30 is a schematic of one example of a label management method in the management tool. In this example, the tree view 21 of the development tool 10A manages labels in the form of system configuration, shared label, and programs, and each of the programs manages a label used only in the program and also a program.

For example, as shown in the figure, when two PLC1 and PLC2 are connected to each other via the network to form the control system, a control program running on the PLC1 (hereinafter, "program PLC1") and a control program running on the PLC2 (hereinafter, "program PLC2") are created as the programs. It is specified which of the PLCs in the system configuration executes each of these programs. More specifically, it is specified so that the program PLC1 is executed by the PLC1 in the system configuration, and it is specified so that the program PLC2 is executed by the PLC2 in the system configuration.

The label includes a label only used in the program PLC1, a label only used in the program PLC2, and a shared label for data exchanged between the PLC1 and PLC2, and these labels are created by using different label tables respectively. In the example of FIG. 30, the label tables for labels other than the shared labels are managed by being associated with the respective programs. In this case, it is specified which of the PLCs executes each of the programs, and thus it is uniquely decided which of the PLCs each label table is associated with.

Figure 31:
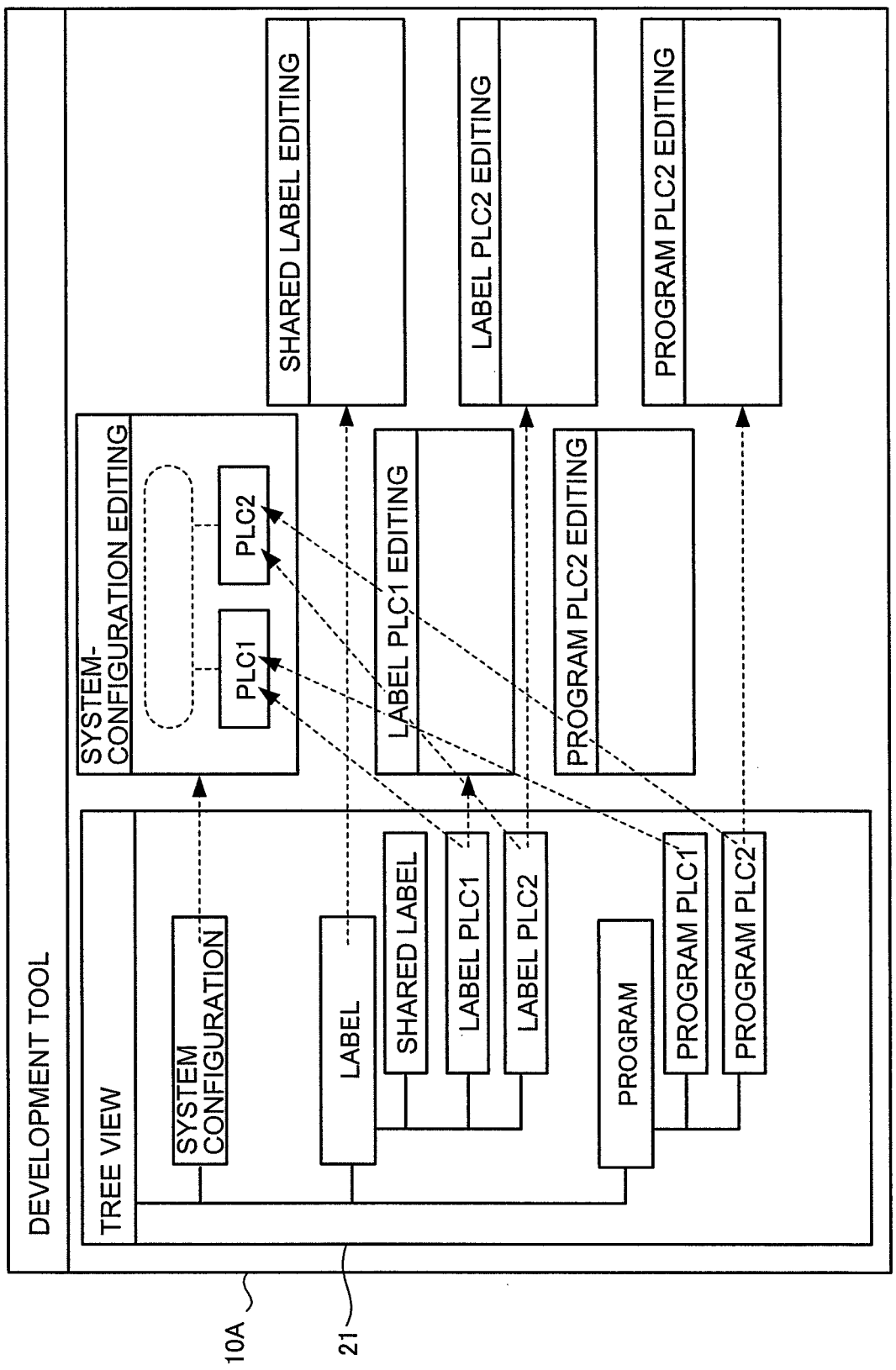
FIG. 31 is a schematic of another example of the label management method in the management tool.

FIG. 31 is a schematic of another example of the label management method in the management tool. In this example, the tree view 21 of the development tool 10A manages labels in the form of system configuration, label, and program. Further, there exist shared label and labels used in the respective PLCs (CPUs) in the lower part of the label, and they are managed by storing their attributes in each label table.

When the control system is formed with the two PLC1 and PLC2 connected to each other via the network in the above manner, it is specified, as an attribute for each label table, whether each label table indicates the shared label or which of the PLC1 and PLC2 each label table is associated with.

When the program PLC1 which is the control program for the PLC1 is to be described, the label table used only in the program PLC1 and shared labels for data exchanged between the PLCs are referenced. Further, when the program PLC2 which is the control program for the PLC2 is to be described, the label table used only in the program PLC2 and shared labels for data exchanged between the PLCs are referenced. Consequently, it is possible to handle labels for data exchanged between the PLC1 and the PLC2 using the same label name, and it is also possible to handle the label used only in the program PLC1 and the label used only in the program PLC2 as different ones even if the labels have the same label name.

As explained above, the programming for the PLCs when the label table for the shared labels and that for the other labels (non-shared labels) are separately managed is completed, and each label is associated with each real device. When the shared label and the non-shared label are separately created beforehand in the above manner, the label in the shared label table is determined as the shared label based on the flowchart of FIG. 15 according to the first embodiment, and thus the determination process A is not needed any more. As a result, it is necessary to clear whether the label is the shared label from the program design. However, the determination process B and the following process(es) are performed and the batch assignment/association process is performed, which makes faster the compiling process. Although the link control system is explained above, the multi-CPU control system can also be processed in the same manner as above.

According to the fourth embodiment, in addition to the effects of the first to the third embodiments, the shared label such that the label is used between PLCs for data exchange between PLCs or used between CPUs for data exchange between multiple CPUs is previously separated from the non-shared label used only in each PLC or in each CPU. Therefore, the association of the label with the link device and the assignment in the link device, or the association of the label with the shared refresh device and the assignment in the shared refresh device can be performed in a shorter time as compared with these of the first to the third embodiments.

Fifth Embodiment

In the fifth embodiment, the case as follows is explained below, the case being such that when a control system is constructed by using two PLCs which are networked and control programs for the two PLCs are to be developed, the label tables are separately managed for shared labels and non-shared labels, and it is specified which of the PLCs writes each label and which of the PLCs reads each label, and then the process of batch assignment/association of labels to devices is performed.

In the fourth embodiment, the shared labels and the non-shared labels are separately managed beforehand, while in the fifth embodiment, the shared-label write/read information used to edit the shared label is further created beforehand, the information being such that it is specified which of the PLCs writes each label and which of the PLCs reads each label. FIG. 32 is a schematic of one example of the shared-label write/read information according to the fifth embodiment.

As explained above, programming for the PLCs in the following case is completed, the case being such that the label tables for the shared labels and the non-shared labels are separated and the shared-label write/read information in which it is specified which of the PLCs writes each label of the shared labels and which of the PLCs reads each label of the shared labels is further prepared. The programming in the above case is completed, and each label is associated with each real device. In this case, the label in the shared label table is determined as the shared label in the flowchart of FIG. 15 according to the first embodiment, and thus the determination process A is not needed any more. Furthermore, it is specified which of the PLCs (CPUs) writes each label in the shared label table and which of the PLCs (CPUs) reads each label therein, and thus the determination process B is also not needed any more. As a result, it is necessary to clear which of the PLCs (CPUs) writes the shared label from the program design. However, only the determination process C and the following process are performed and the batch assignment/association process is performed, which makes faster the compiling process.

According to the fifth embodiment, in addition to the effects of the fourth embodiment, the labels of the shared labels are managed by specifying which of the PLCs (CPUs) writes the label and which of the PLCs (CPUs) reads the label. Therefore, the association of the label with the link device and the assignment in the link device, or the association of the label with the shared refresh device and the assignment in the shared refresh device can be performed in a shorter time as compared with these of the first to the fourth embodiments.

The programming support method can be realized by causing a computer such as a personal computer or a work station having a CPU (central processing unit) to execute programs with the procedure written therein. In this case, the CPU (controller) of the computer executes each step of the programming support method according to the programs. These programs are executed by being stored in a computer-readable recording medium such as a hard disk, a floppy(Trademark) disk, CD(Compact Disk)-ROM(Read Only Memory), MO(Magneto-Optical disk), and DVD(Digital Versatile disk or Digital Video Disk) and being read by the computer from the recording medium. These programs can also be distributed via a network (communication line) such as the Internet.

INDUSTRIAL APPLICABILITY

As explained above, the programming support apparatus according to the present invention is useful for creation of the control program when controllers such as a plurality of PLCs or CPUs form one control system.

The invention claimed is:
1. An apparatus for supporting a creation of a control program using a label with which each of a plurality of control devices provided in a control system controls a target object to be controlled, the apparatus comprising:
 a computer processor unit (CPU);
 a shared-label extracting unit that uses the CPU and extracts a shared label from control programs of the control devices, the shared label being included in at least a first control program and a second control program among the control programs, wherein a shared label is to be associated with a device corresponding to memories, each of which is included in one of the control devices and is shared by the control devices,
 a shared-label write/read information generating unit that identifies for each of the control devices, whether each of data for which one of the shared labels is used is to be written or to be read by corresponding one of the control devices, by referring to a control program executed by the corresponding one of the control devices, and generates shared-label write/read information;
 a device batch assigning/associating unit that sorts the shared labels into sets using the shared-label write/read information such that the shared labels included in the same one of the sets are to be written by the same one of the control devices, and associates each of the shared labels with an address of each of the devices such that data, for which the shared labels included in the same one of the sets are used, are stored in an continuous area of the device; and
 a system-configuration determining unit that determines a configuration of the control system based on system configuration information indicating a configuration of the control system,
 wherein the device batch assigning/associating unit associates each of the shared labels with the address of each of the devices based on a result of determination by the system-configuration determining unit, and
 wherein each of the shared labels is replaced with an address when the control program is compiled.

2. The apparatus according to claim 1, wherein the configuration of the control system includes a link configuration in which a plurality of programmable control devices is connected via a network, and
 a multi central processing unit configuration in which a plurality of central processing units is mounted on a base unit and are connected via a bus, based on system configuration information indicating the configuration of the control system,
 when the configuration of the control system is the link configuration, the device batch assigning/associating unit associates an address of a link device provided in each of the programmable control devices with each of the shared labels, and
 when configuration of the control system is the multi central processing unit configuration, the device batch assigning/associating unit associates an address of a shared refresh device provided in each of the central processing units with each of the shared labels.

3. A method of supporting a creation of a control program using labels with which each of a plurality of control devices provided in a control system controls a target object to be controlled, the method comprising:
 extracting shared labels from control programs of the control devices, the shared label being included in at least a first control program and a second control program among the control programs, wherein the shared labels are to be associated with a device corresponding to memories, each of which memories is included in one of the control devices and is shared by the control devices;
 shared-label write/read information generating including identifying, for each of the control devices, whether each of data for which one of the shared labels is used is to be written or to be read by corresponding one of the control devices by referring to a control program executed by the corresponding one of the control devices, and generating shared-label write/read information;
 determining a configuration of the control system based on system configuration information indicating a configuration of the control system; and
 device batch assigning and associating including sorting the shared labels into sets using the shared-label write/read information such that the shared labels included in the same one of the sets are to be written by the same one of the control devices, and
 associating each of the shared labels with an address of each of the devices such that data, for which the shared labels included in the same one of the sets are used, are stored in an continuous area of the device, and
 the associating is performed based on a result of determination at the determining,
 wherein each of the shared labels is replaced with an address when the control program is compiled.

4. The method according to claim 3, wherein the configuration of the control system includes a link configuration in which a plurality of programmable control devices is connected via a network, and a multi central processing unit configuration in which a plurality of central processing units is mounted on a base unit and are connected via a bus, based on system configuration information indicating the configuration of the control system, when the configuration of the control system is the link configuration, the device batch assigning and associating includes associating an address of a link device provided in each of the programmable control devices with each of the shared labels, and when configuration of the control system is the multi central processing unit configuration, the device batch assigning and associating includes associating an address of a shared refresh device provided in each of the central processing units with each of the shared labels.

5. A non-transitory computer-readable recording medium that stores therein a computer program for supporting a creation of a control program using a label with which each of a plurality of control devices provided in a control system controls a target object to be controlled, the computer program causing a computer to execute:

extracting shared labels from control programs of the control devices, the shared label being included in at least a first control program and a second control program among the control programs, wherein the shared labels are to be associated with a device corresponding to memories, each of which memories is included in one of the control devices and is shared by the control devices;

shared-label write/read information generating including identifying, for each of the control devices, whether each of data for which one of the shared labels is used is to be written or to be read by corresponding one of the control devices by referring to a control program executed by the corresponding one of the control devices, and generating shared-label write/read information;

determining a configuration of the control system based on system configuration information indicating a configuration of the control system; and device batch assigning and associating including sorting the shared labels into sets using the shared-label write/read information such that the shared labels included in the same one of the sets are to be written by the same one of the control devices, and associating each of the shared labels with an address of each of the devices such that data, for which the shared labels included in the same one of the sets are used, are stored in an continuous area of the device, and the associating is performed based on a result of determination at the determining, wherein each of the shared labels is replaced with an address when the control program is compiled.

* * * * *